United States Patent [19]

Freudenstein

[11] Patent Number: 4,865,577
[45] Date of Patent: Sep. 12, 1989

[54] NONCIRCULAR DRIVE
[75] Inventor: Ferdinand Freudenstein, Bronx, N.Y.
[73] Assignee: Trustees of Columbia University in the City of New York, Morningside Heights, N.Y.
[21] Appl. No.: 242,026
[22] Filed: Sep. 8, 1988
[51] Int. Cl.$^4$ .............................................. F16H 55/30
[52] U.S. Cl. .................................. 474/141; 29/159 R; 74/594.2; 280/259
[58] Field of Search ........................... 474/141, 69, 70; 29/159 R, 159.2; 74/594.2; 280/259-261

[56] References Cited

U.S. PATENT DOCUMENTS

| | | | |
|---|---|---|---|
| 431,529 | 7/1890 | Redlinger | 474/141 X |
| 513,589 | 1/1894 | Metz | 474/141 |
| 515,449 | 2/1894 | Scovell | 474/141 |
| 528,145 | 10/1894 | Carr | 474/141 X |
| 530,058 | 11/1894 | Schaum et al. | 474/114 X |
| 599,211 | 2/1898 | Williams | 474/141 |
| 611,170 | 9/1898 | Howard | 474/141 X |
| 613,756 | 11/1898 | Buddle | 474/141 |
| 885,982 | 4/1908 | Delacroix | 474/141 X |
| 1,906,801 | 5/1933 | Mather | 474/141 X |
| 1,963,314 | 6/1934 | Savell et al. | 474/141 X |
| 2,277,458 | 3/1942 | Schultze | 474/141 X |
| 2,693,119 | 11/1954 | Payberg et al. | 474/141 X |
| 2,711,221 | 6/1955 | Kopczynski | 474/141 X |
| 2,994,216 | 8/1961 | Morton | 474/141 X |
| 3,259,398 | 7/1966 | Hattan | 474/141 |
| 4,181,034 | 1/1980 | Daniel | 474/141 |
| 4,522,610 | 6/1985 | Nagano | 474/141 |

FOREIGN PATENT DOCUMENTS 0797600 4/1936 France .................................. 474/141

OTHER PUBLICATIONS

Anonymous, *Elliptical Sprocket Boosts Biker's Mileage*, Machine Design 46, Feb. 7, 1974, p. 43.
Whitt, F. R. and Wilson, D. G., *Bicycling Science and Ergonomics and Mechanics*, 2d 3d., M.I.T. Press, Cambridge, MA, 1982, pp. 288-290.
Shimano Industrial Co., Ltd., *The New Shape for Pedaling Efficiency*, undated product literature in product packaging.
Miller, N. R. and Ross, D., *The Design of Variable-Ratio Chain Drives for Bicycles and Ergometers—Application to a Maximum Power Bicycle Drive*, Trans. ASME 105, J. of Mechanical Design, 1980.
Sadler, J. P. and Krump, M. A., *Synthesis of Band Mechanisms with Variable Velocity Ratios*, ASME Paper 84-DET-51, 1984.
Bloomfield, B., *When you Need Noncircular Gears*, Product Engineering, Mar. 14, 1960.

*Primary Examiner*—Thuy M. Bui
*Attorney, Agent, or Firm*—Brumbaugh, Graves, Donohue & Raymond

[57] ABSTRACT

Noncircular drives, including chain drives with noncircular sprockets, achieve a desired functional relationship and minimize slack variation in the elongate flexible member thereof. Noncircular gears having the desired functional relationship are first designed. Noncircular members having the same pitch curve or operative surface configuration as the pitch curves of the noncircular gears are theoretically located at the desired center-to-center distance of the noncircular rotational members of the drive being designed. The noncircular members are manipulated such that points initially in contact on the gears are not joined by a common tangent. Using a computer, the drive is incremented with the common tangent acting as the driving span of the flexible member. At each increment functional relationship error and overall length of a taut elongate flexible member are calculated. The variation in taut flexible member length is the slack variation. In the event of excess functional relationship error, the design procedure is iterated modifying the functional relationship on which the original gear pair was based by adding the functional relationship error. This iterative procedure is continued until functional relationship is acceptable. If the slack variation is excessive, the same procedure continues with the other span, i.e., common tangent, driving until again the functional relationship is acceptable. If slack variation is still unacceptable, the design procedure continues using first the one run of the flexible member and then the other until both functional relationship and slack variation is acceptable.

29 Claims, 12 Drawing Sheets

NONCIRCULAR DRIVE

BACKGROUND OF THE INVENTION

This invention relates to a drive such as a chain, belt, band, or tape drive, with spaced noncircular, rotational members interconnected in driving relation by a flexible endless chain, belt, band, tape or the like. More particularly, the invention relates to a drive of this nature that accomplishes the desired functional relationship, and in which the noncircular members and elongate flexible drive member entrained about them in driving relation operate with a minimum of slack variation in the flexible drive member.

Over the years, chain drives with noncircular sprockets, particularly for bicycles, have been proposed. Many or all proposals of this nature lack any teaching of how to accomplish a preferred functional relationship between driving and driven noncircular rotational members. Many such proposals entirely fail to address the likely variations in slack in the chain and how to eliminate that or compensate for that. Some proposed drives with one slightly elliptical sprocket simply rely upon the conventional chain drive's limited tolerance for variation in slack. Other proposed noncircular drives of this nature utilize a movable compensatory slack take-up idler sprocket or roller to maintain the chain taut as the sprockets turn, by taking up the excessive slack that occurs. Another proposed approach has been to vary the distance between the sprockets during each rotation to take up the excessive slack that would otherwise periodically occur. On occasion, it has been suggested to make both of the pair of sprockets noncircular, but without any clear indication how this might be accomplished.

In this last category of chain and sprocket drives with two noncircular sprockets, one suggestion in the patent literature was to use on a bicycle two elliptical sprockets of differing sizes about which is entrained the typical chain. No consideration was given to the differing rates of rotation of the two different sized sprockets, or the resulting changing angular relationship between sprockets, whereby one sprocket would not necessarily be in the correct position to take up slack when the other tended to contribute to the slack. A similar proposal was to mount eccentrically the rear sprocket of a bicycle so that, as that sprocket turned, it was to move eccentrically about its axis of rotation to take up the slack that resulted from an elliptical drive sprocket. Again, there was no recognition that the changing angular relationship between the sprockets throughout the rotation thereof would prevent operation of the drive as desired.

Only simple functional relationships between driving and driven rotational members have been sought for the prior art noncircular drives mentioned above. Writings on the subject have expressed no understanding that accomplishment of a variety of functional relationships between driving and driven members could be sought while minimizing slack variations.

BRIEF SUMMARY OF THE INVENTION

In accordance with this invention, there is provided a drive, and a method of manufacturing a drive, with noncircular rotational members, such as sprockets, pulleys, rollers or the like, about which is entrained an endless drive chain, belt, or other flexible endless member, the drive having a desired functional relationship of the rotational members and limited variation in the slack of the endless member. More particularly, the methods and apparatus according to the invention use, initially, the design of noncircular gears to arrive at noncircular member shapes correctly functionally related as to size and shape and having, in many embodiments, a sufficiently taut endless member for all angular relationships of the noncircular members.

As used herein, noncircular, when applied to gears and sprockets, refers to the pitch curve of that element. The term noncircular member as used herein means a member that has a noncircular surface or pitch curve, or a member that has a circular surface or circular pitch curve, but is eccentric respecting its point or axis of rotation. The term operative surface is occasionally used herein. It means the pitch curve in the case of gears, sprockets or other toothed or notched rotational members or the actual smooth surface of rollers pulleys and the like. "Center" as used herein means the point or axis of rotation of a noncircular member.

The drive and its method of manufacture can be applied to the typical two-sprocket chain and sprocket drive of the kind used on bicycles, but it is applicable, as well, to many drives in which one rotary member drives another, via an entrained endless band, belt or other flexible, endless member. The drive may have more than two rotational members about which the endless flexible member is entrained, and all may be noncircular. In drives with just one driving and one driven noncircular member, the rotational member shapes can very often achieve the desired functionality and sufficient tautness throughout cycling of the drive. Drives according to the invention can be used for machinery in which there is desired a functional relationship that varies in speed, angular displacement, or mechanical advantage as the rotational members turn through a single cycle of operation. In other words, while the drive may accomplish three revolutions of the driven rotational member for each individual revolution of the drive member, the difference in speed between the two members and the mechanical advantage may vary with the angle of the rotational members, rather than maintaining a constant 3 to 1 ratio, as in drives with circular members.

In the bicycle art it is known that it would be of advantage to have an elliptical driving sprocket that (1) imparts greater speed to the rear sprocket, but lower mechanical advantage, during each downward stroke of a pedal, where the rider more easily applies greater force, and that (2) has a higher mechanical advantage, but imparts less speed to the rear sprocket, at the bottom (and top) of each pedal's path, where the rider is less capable of applying force. Another application of the noncircular drive of the invention is a stationary exercise bicycle in which the force that must be applied to the pedal varies through the drive sprocket's rotation to achieve increased exercise benefit. The drives can find application in other exercise machines, wherein, as in known machines of other construction, the force required varies with the position of the member to which force is applied. Drives according to this invention can find application in shaker conveyors. Other applications are nonuniform motion transmissions using a chain, tape, belt, or band drives, or timing belts. And harmonic motion generators driven by drives according to this invention can have their operation appropriately refined by attention to the size and shape of the noncircular members.

In the method of making drives pursuant to the invention, a central step is the establishment, by known techniques available from standard texts, of a noncircular gear pair. This gear pair, which is a design tool, not an actual physical gear pair, can be externally meshing with exterior pitch curves in contact, or it can be internally meshing with the exterior geared surface of the one gear engaging an interior geared surface of the other. One first determines the functional relationship desired from the ultimate noncircular drive. Then a gear pair that satisfies that relationship is designed using known techniques. Such techniques are reported, for example, in Bloomfield, "Noncircular Gears," Product Engineering, Mar. 14, 1960, incorporated herein by reference. Thereafter occurs a series of manipulative steps. Several are described in detail below. The gears are first separated a distance equal to the desired center-to-center distance between the noncircular rotational members of the drive being designed. In the case in which externally meshing gears are chosen for use in the design process, the pitch curves of the separated gears represent the shapes of the two rotational members. In the case of the internally meshing gears, the internal geared surface's pitch curve, and the meshed externally geared surface's pitch curve represent the shapes of the two rotational members. Spaced apart the desired distance, the rotational members' sizes are reduced uniformly, keeping their relative sizes, and thus their functional relationship. This is to reduce the variation in the inclination of the upper and lower runs of an endless member entrained about their exterior surfaces. In the case of a chain drive, the sprocket sizes, measured along the pitch curves of the sprockets, must also correspond to an integral number of chain pitches.

Next in the manipulative steps, in the case in which one started with externally meshing noncircular gears of the desired functional relationship, each noncircular member is rotated through an angle such that the points on the gears that had been in contact now lie above the "center", or axis of rotation of their respective noncircular members. One gear is flipped, or turned over, about an axis from its center to that previously contacting point that is now directly above its center. The gears are rotated slightly until a common tangent line can be drawn between the previously contacting points. This tangent represents the upper run of the endless member at this point in the design. The procedure can be effected, if desired, so as to first produce a lower common tangent, representing the lower run of the endless member in driving relationship between the noncircular members. This can be done by following the above procedure, but bringing the points that were in contact on the gears directly below the centers, flipping the one gear, and rotating slightly as needed to draw the tangent.

In the case of the internally meshed gears that have been separated to define the sprockets' shapes at the desired distance, the gears are similarly manipulated, but without the step of flipping or turning over the one gear. In other words, the gears are again reduced in size proportionally, so as not to disturb the relationship therebetween, but reducing the variation in inclination of the upper and lower runs of the endless member that occur during operation, and being certain in the case of a chain drive to arrive at gear sizes equalling an integral number of chain pitches for a given chain. Again, rotating the noncircular members slightly as necessary, the points above the centers of the rotational members that had been the contacting points of the gears' pitch curves are connected by a tangent line representing the upper (or lower) run of the endless member.

Using either of the above procedures, preferably using a suitably programmed computer, the functional relationship of the drive is examined throughout rotation of the noncircular members. This is first done with one run of the endless member driving. The error in the generated functional relationship is measured at each incremental rotation of the driving rotational member. The length of a taut endless member is measured at each incremental rotation, and the excess slack is calculated by subtracting the shortest length of a perfectly taut endless member in a complete cycle from the longest perfectly taut endless member in that cycle. If the error in the functional relationship, e.g., the error in angular displacement, is within acceptable bounds, and the length of the taut endless member is acceptable, the design procedure is complete. If the functional relationship error is excessive, then a second iteration of the design procedure is effected using a design functional relationship modified to lessen the functional error. The new design functional relationship can be the original, desired functional relationship plus the functional relationship error at each of the incremental angular positions where the functional relationship was observed. Again the functional relationship of the drive formulated in this iteration is compared to the original, desired functional relationship, and the error is measured at incremental angular positions of the driving rotational member. The slack variation is again measured in the same way. If both errors are acceptable the design is complete. If the functional relationship error is still excessive, a further iteration is undertaken, and so on until the functional relationship error is acceptable.

If after the original incremental measuring routine, or any iteration thereof, the functional relationship error is acceptable, but the endless member slack variation is unacceptably large, then the drive is incremented throughout a complete cycle with the other run of the endless member driving. The same procedure is followed, i.e., measuring endless member slack variation and functional relationship error and iterative revision to bring functional relationship error within bounds. This can result in an acceptable drive, or repeated applications of these techniques, first with one run driving and then the other run driving, may be necessary until both functional relationship and slack variation are within bounds.

There will be those functional relationships for which excessive slack cannot be eliminated. There will also be those design applications for which no amount of slack will be acceptable. In these cases, a tensioner, such as the mentioned moveable slack take-up roller or idler, may be used to eliminate slack virtually entirely. In the event a tensioner is employed, the described design process has minimized the amount of translational movement necessary for the roller to eliminate slack.

FIG. $5a_1$ and $5b_1$ are enlarged fragmentary views illustrating the relationship of tangents of one noncircular member relative to the remaining noncircular member as the noncircular members are positioned to establish a common tangent.

Figure 6:
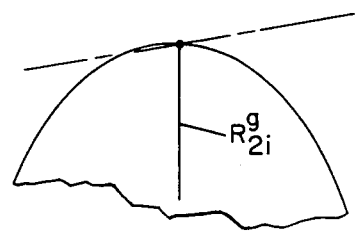
Figure 4D:
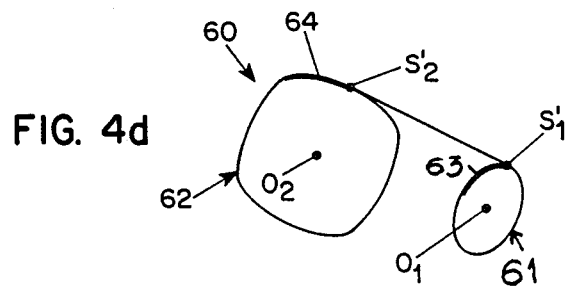
Figure 6:
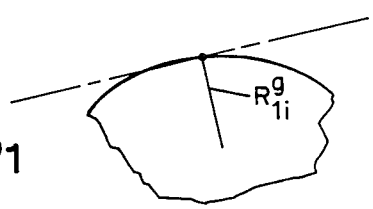
Figure 6:
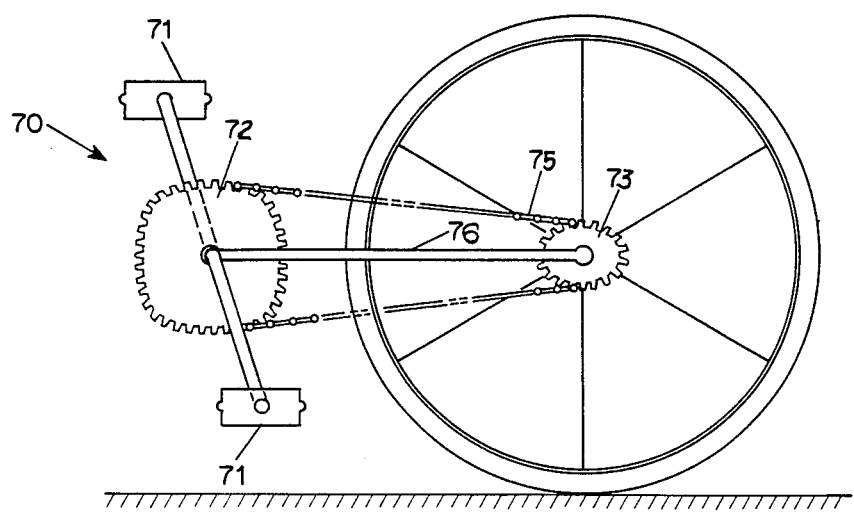

FIG. 6 is a diagrammatic illustration of a bicycle drive having noncircular sprockets according to the invention.

Figure 7A:
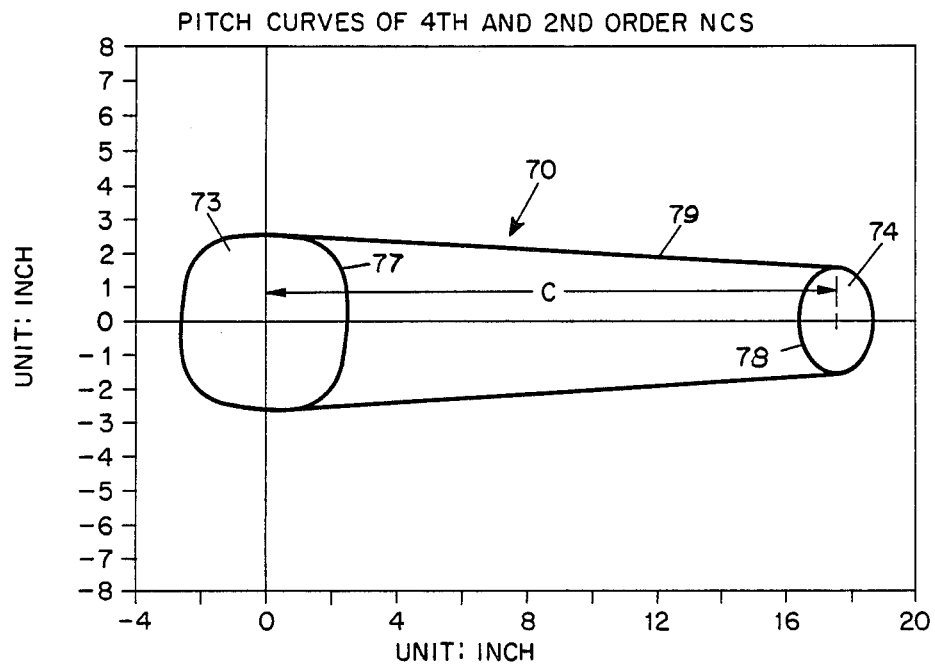

FIG. 7a is a diagrammatic illustration of the drive of FIG. 6 and shows more accurately the fourth order elliptical and second order elliptical shapes of the drive and driven sprocket pitch curves, their relative sizes and spacing.

Figure 7B:
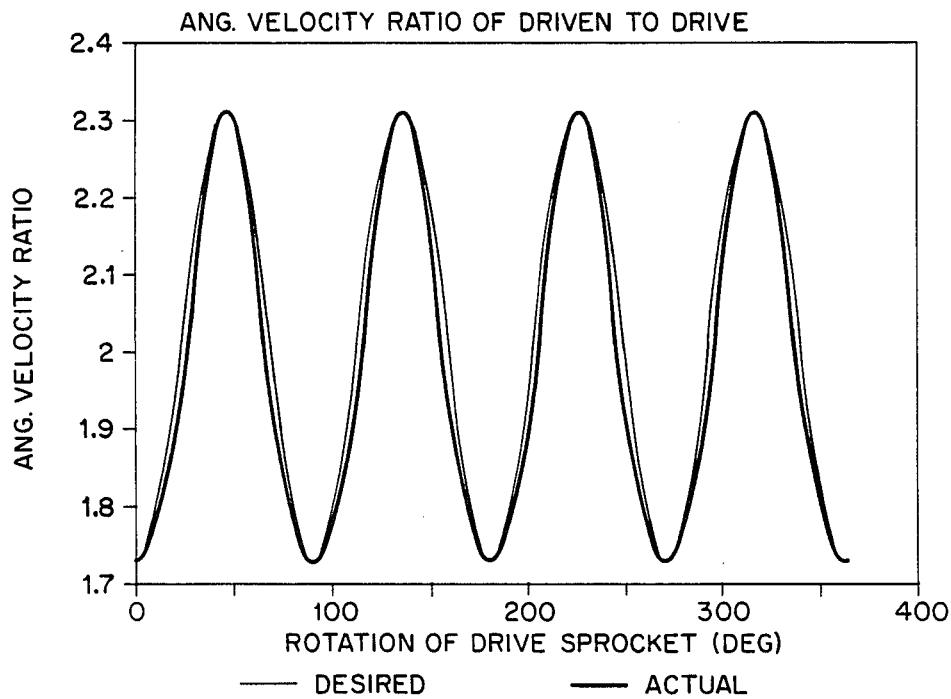

FIG. 7b is a graphic representation of the angular velocity ratio variation of the drive of FIG. 7a, initially and after one design iteration.

Figure 7C:
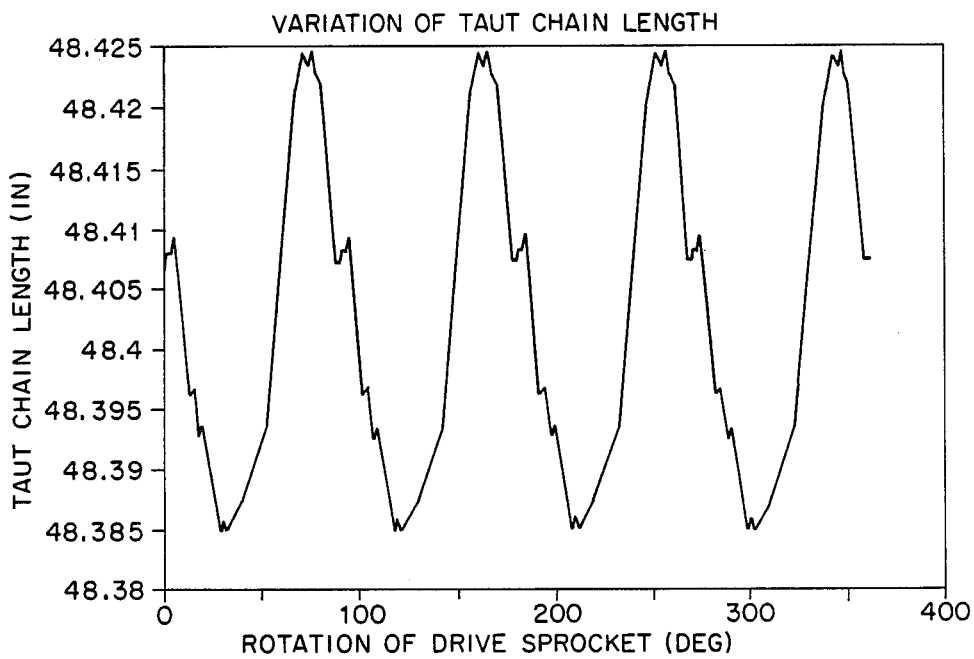

Fig. 7c is a graphic illustration of variation in taut chain length of the drive of FIG. 7a.

Figure 8A:
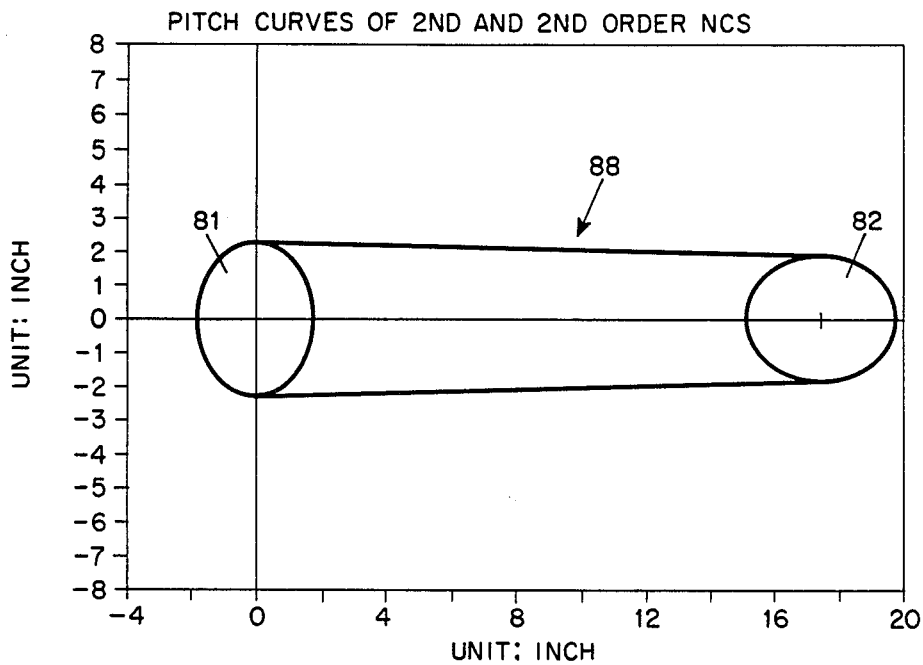

FIG. 8a is a graphic illustration of angular displacement error of the drive of FIG. 7a, initially and after one design iteration.

FIG. 8a is a diagrammatic illustration of a further noncircular drive and shows the second order elliptical shapes of the drive and driven sprocket pitch curves, their relative sizes and spacing.

Figure 8B:
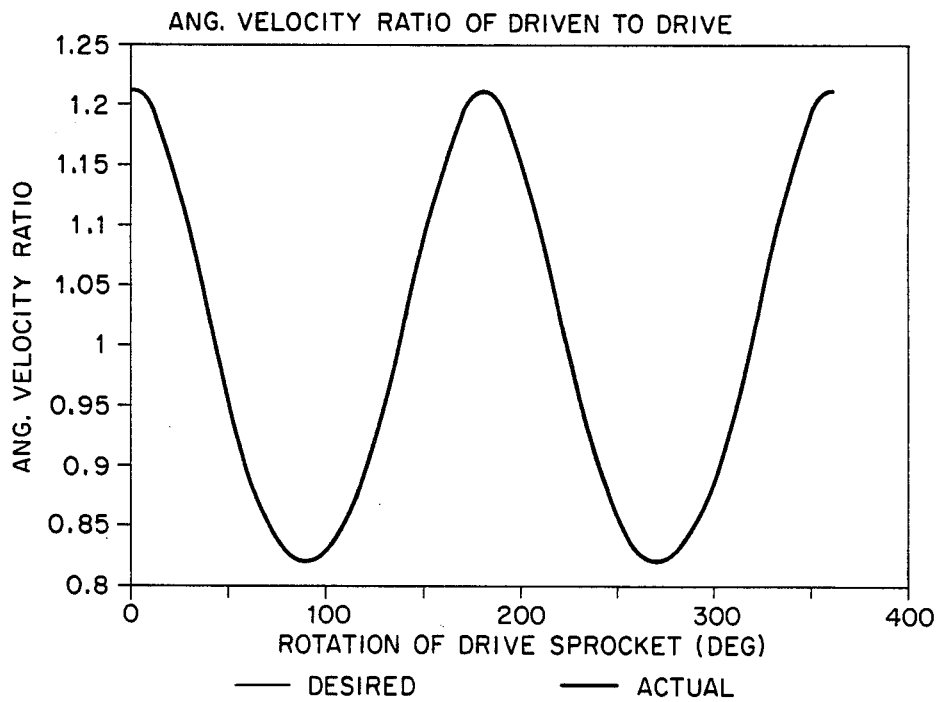

FIG. 8b is a graphic representation of the angular velocity ratio variation of the drive of FIG. 8a, initially and after one design iteration.

Figure 8C:
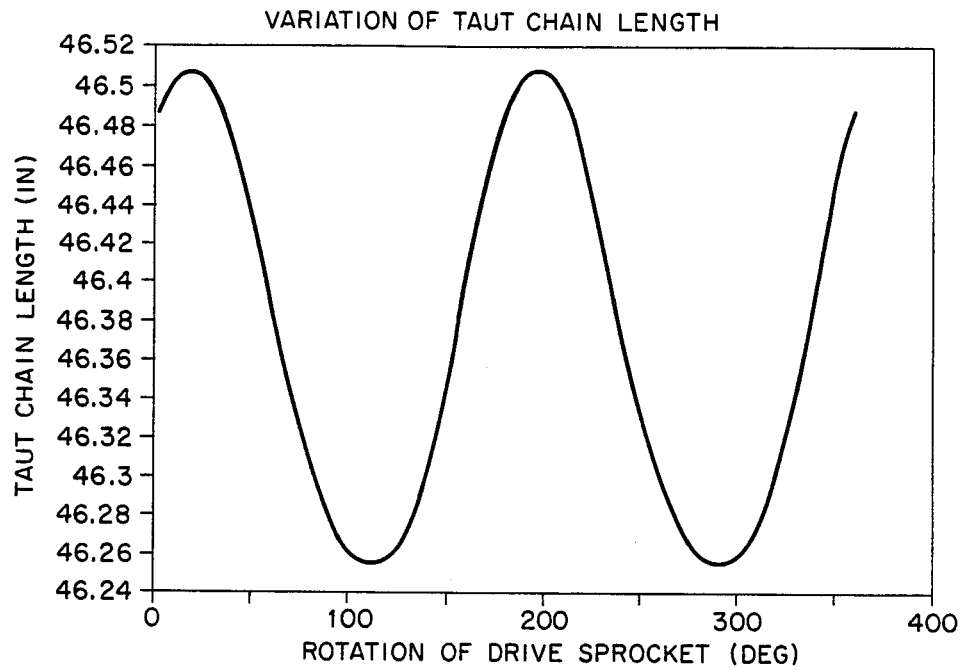

FIG. 8c is a graphic illustration of variation in taut chain length, of the drive of FIG. 8a.

Figure 8D:
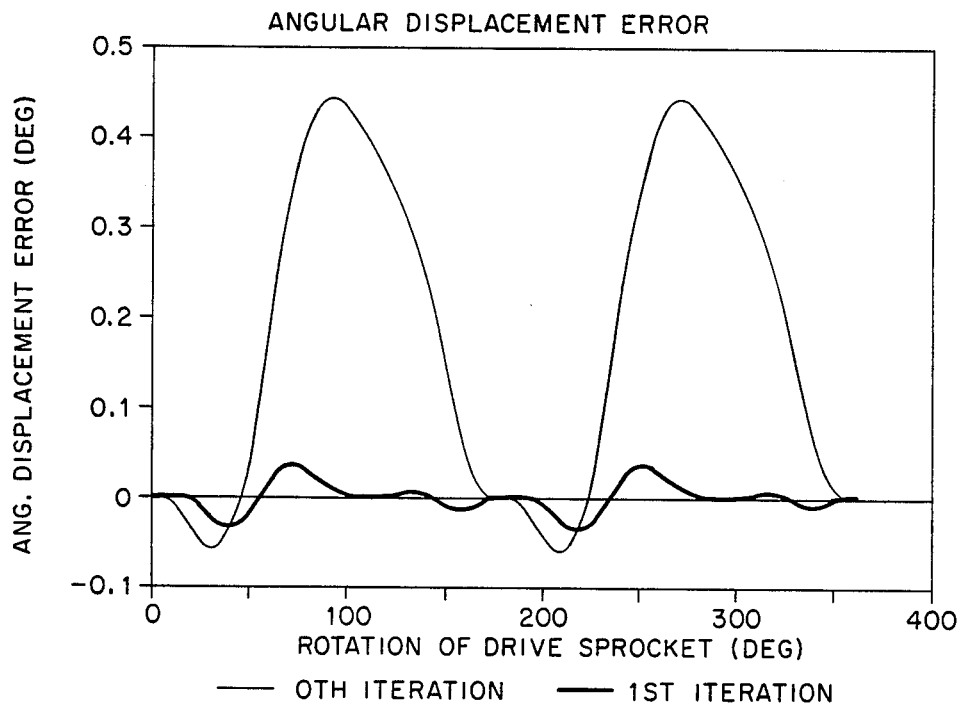

FIG. 8d is a graphic illustration of angular displacement error of the drive of FIG. 8a, initially and after one design iteration.

Figure 9A:
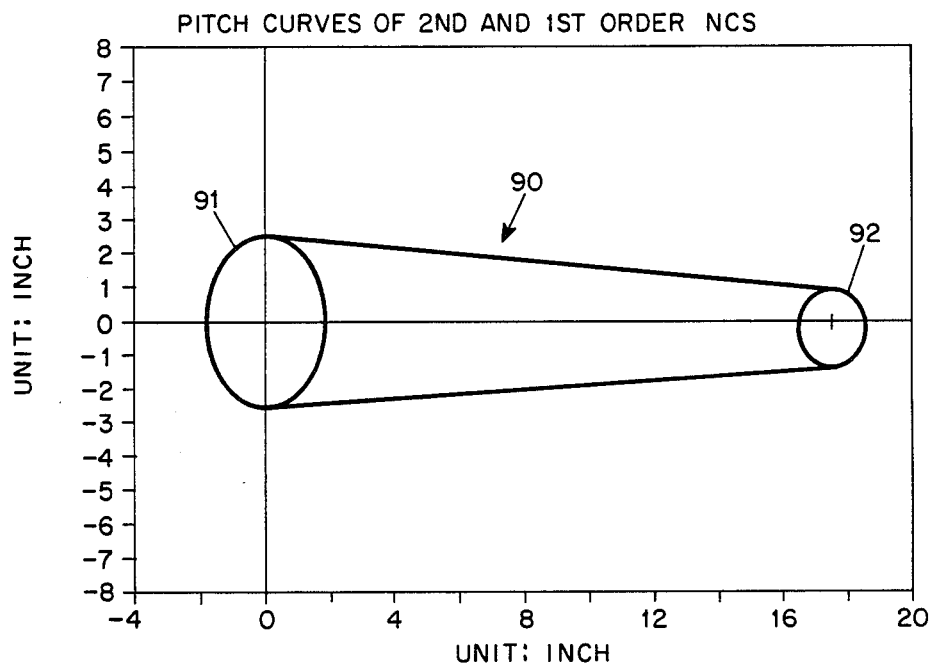

FIG. 9a is a diagrammatic illustration of a further noncircular drive and shows the second order and first order elliptical shapes of the drive and driven sprocket pitch curves, their relative sizes and spacing.

Figure 9B:
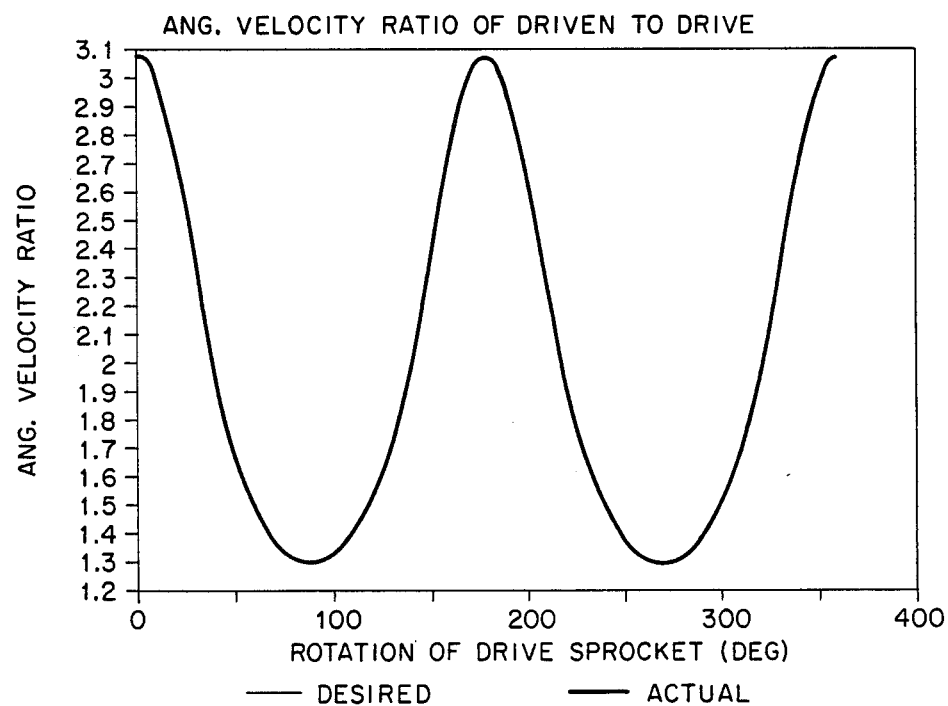

FIG. 9b is a graphic representation of the angular velocity ratio variation of the drive of FIG. 9a, initially and after one design iteration.

Figure 9C:
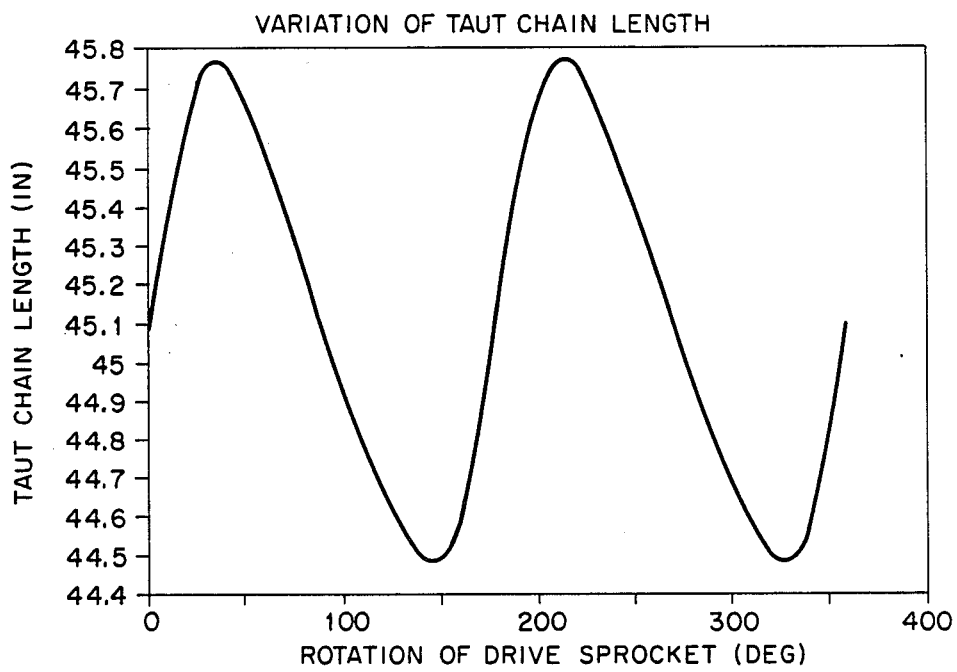

FIG. 9c is a graphic illustration of variation in taut chain length of the drive of FIG. 9a.

Figure 9D:
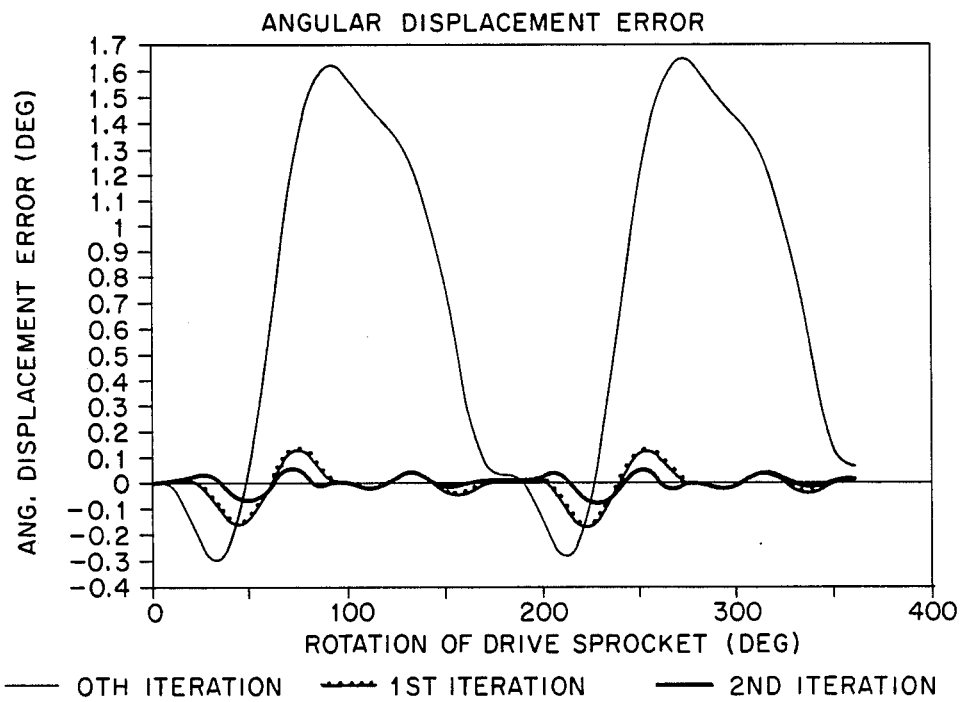

FIG. 9d is a graphic illustration of angular displacement error of the drive of FIG. 9a, initially and after one design iteration.

Figure 10:
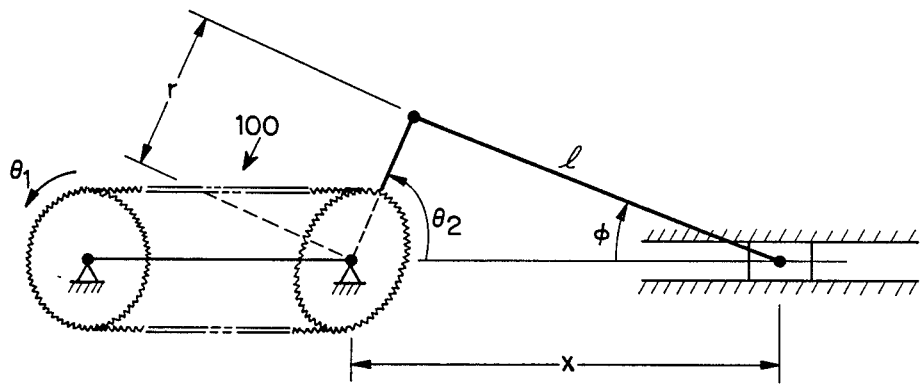

FIG. 10 is a diagrammatic illustration of harmonic motion generator having a noncircular chain drive according to the invention.

Figure 11E:
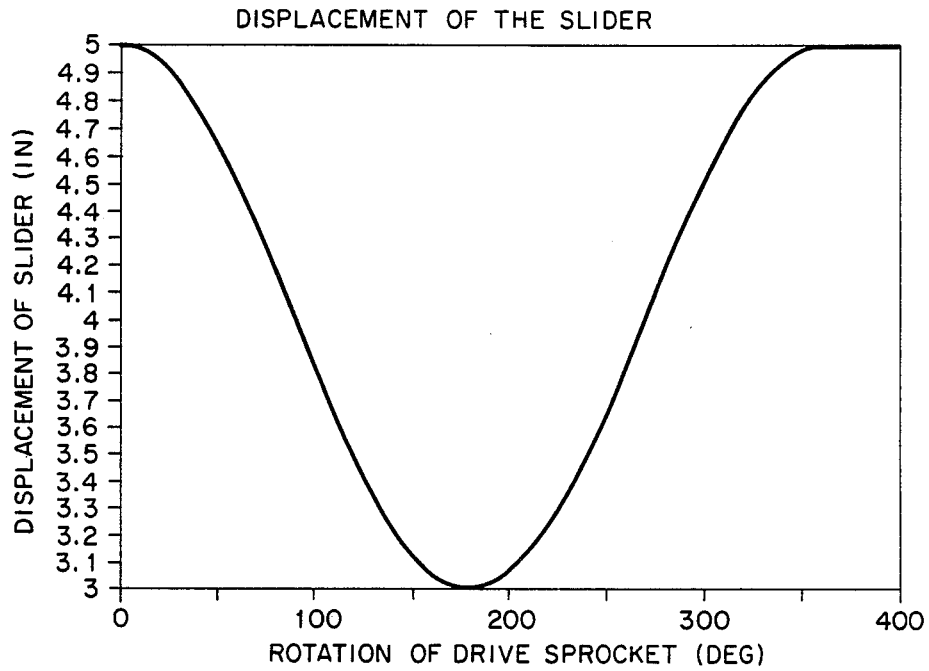
Figure 11A:
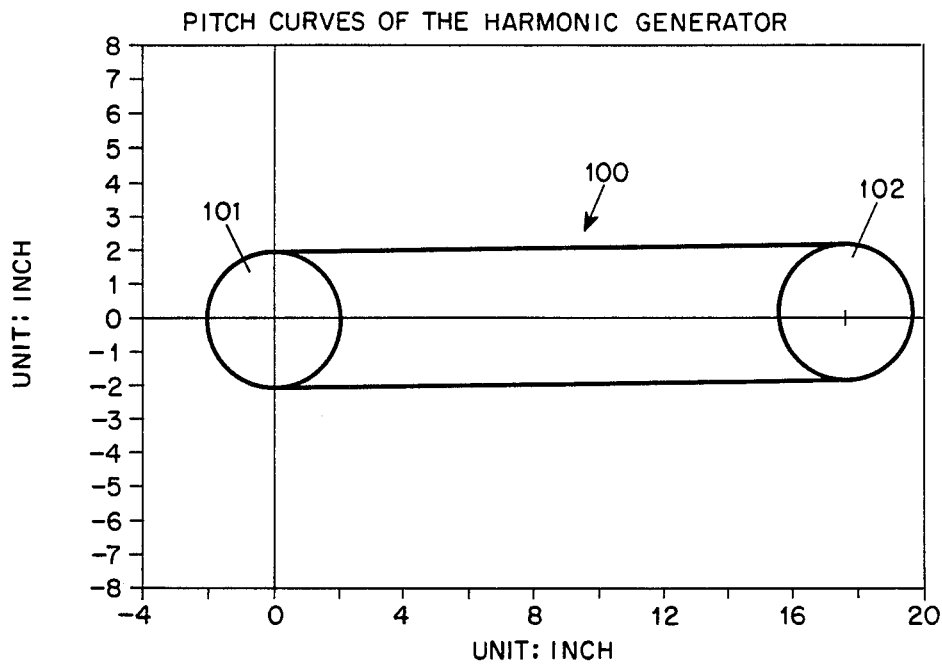

FIG. 11a is a diagrammatic illustration of the drive of FIG. 10 and shows more accurately the pitch curves of the drive and driven sprockets, their relative sizes and spacing.

Figure 11B:
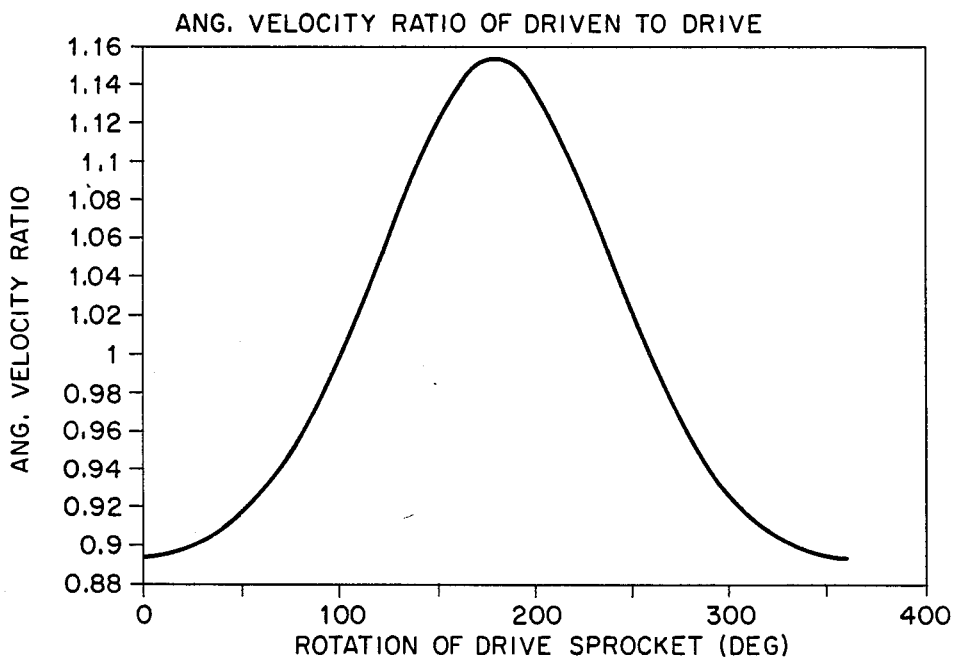

FIG. 11b is a graphic representation of the angular velocity ratio variation of the drive of FIG. 11a, initially and after one design iteration.

Figure 11C:
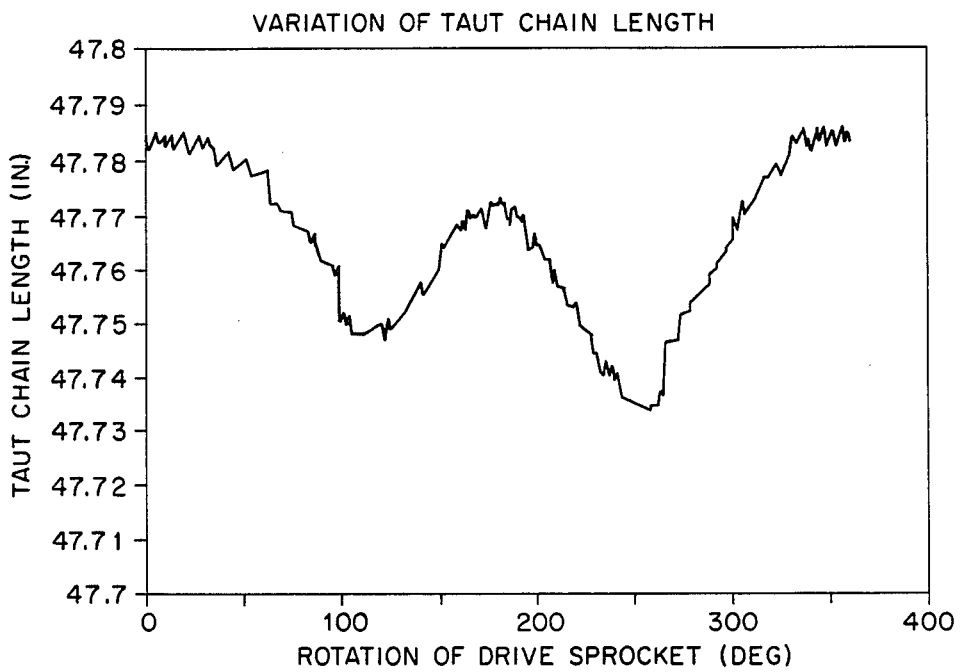

FIG. 11c is a graphic illustration of the variation in taut chain length, of the drive of FIG. 11a.

Figure 11D:
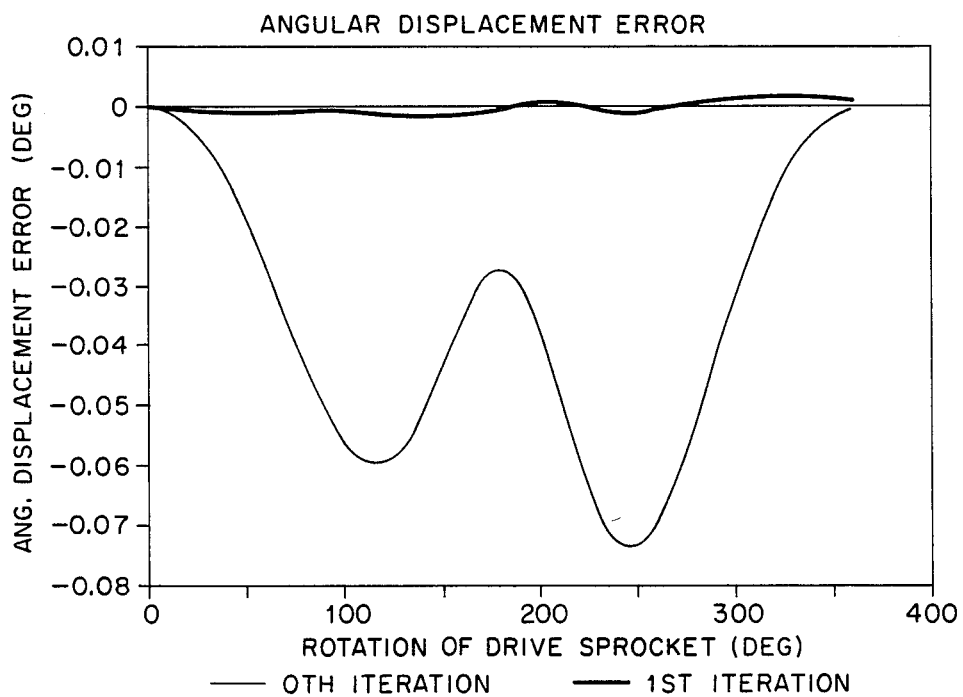

FIG. 11d is a graphic illustration of angular displacement error of the drive of FIG. 11a, initially after one design iteration.

FIG. 11e is a graphic representation of the displacement of the slider in the harmonic motion generator of FIG. 10 driven drive of FIG. 11a.

Figure 12:
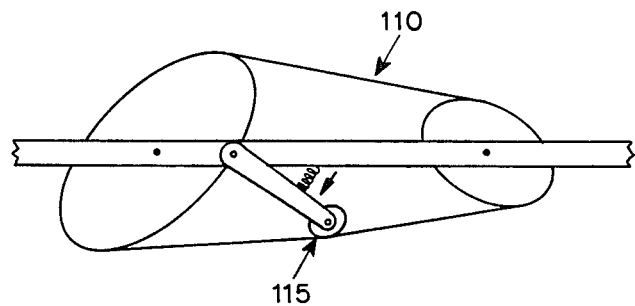

FIG. 12 is a diagrammatic illustration of a noncircular drive in accordance with the invention and shows a spring-biased idler for slack take-up.

Figure 13:
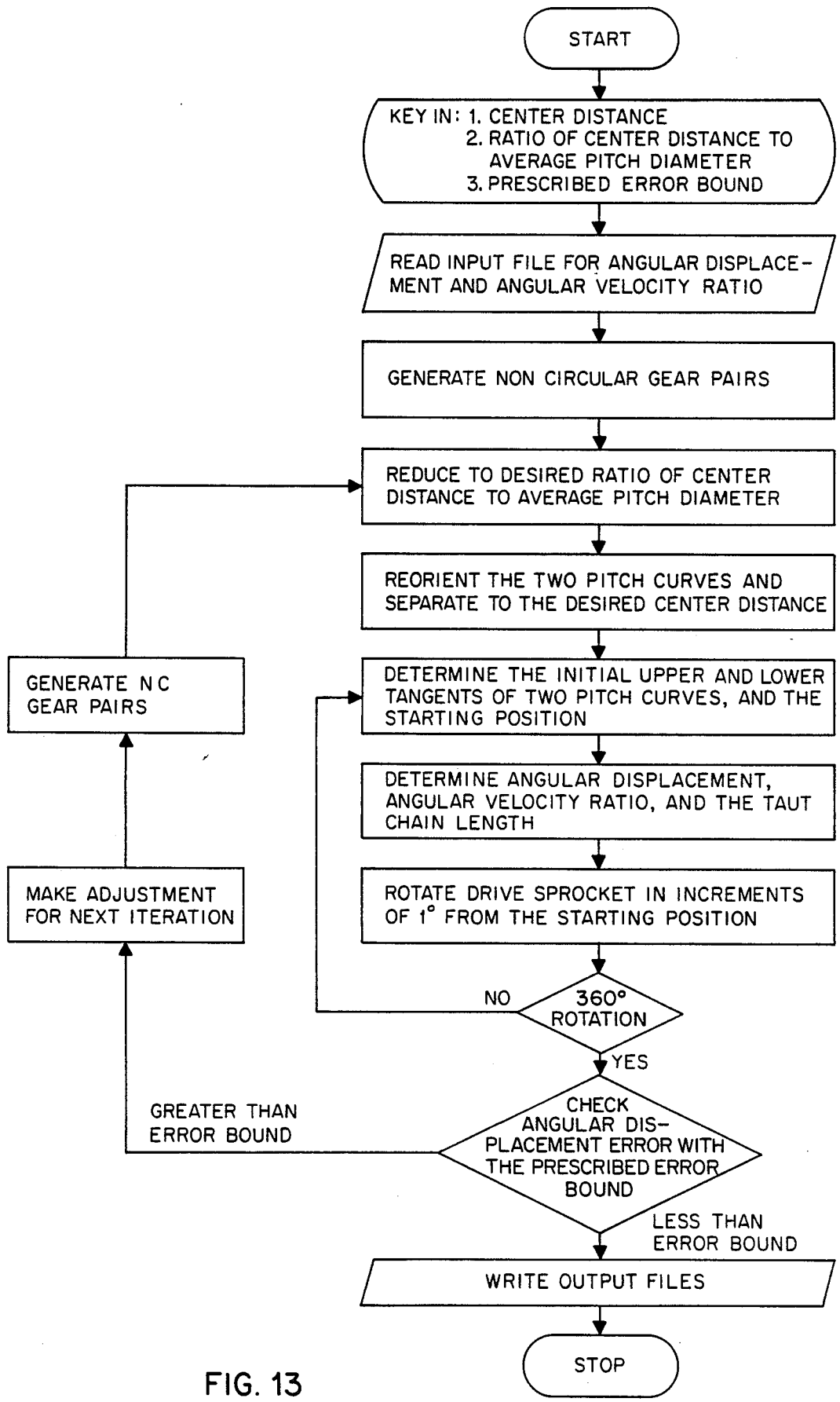

FIG. 13 is a flow chart of the steps in the process of arriving at the drive according to the invention.

DETAILED DESCRIPTION OF THE PREFERRED EMBODIMENTS

Figure 1:
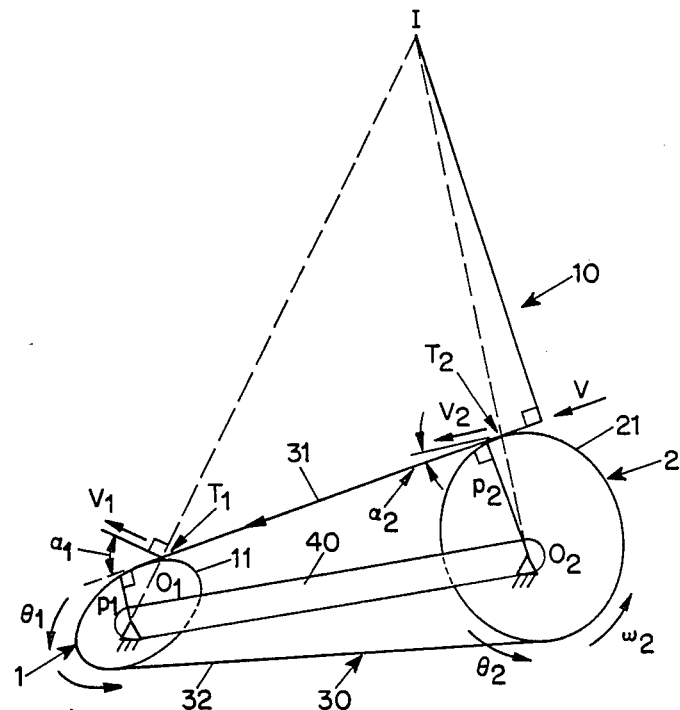
FIG. 1 is a diagrammatic illustration of a generalized noncircular drive and shows driving and driven noncircular members interconnected by an elongate flexible member.

In FIG. 1 a generalized noncircular drive 10 is shown. A first noncircular rotational member 1 and a second noncircular rotational member 2 are interconnected by an endless, elongate flexible member 30. In the preferred, exemplary embodiments described, the design steps and the resulting mechanical characteristics of the preferred embodiments of drives are applied to chain and sprocket drives, with the understanding that these same principles and mechanical characteristics enable the design and manufacture of various other drives such as belt, band, or tape drives. In chain and sprocket drives the noncircular members 1 and 2 are, of course, sprockets, and their surfaces 11 and 21, shown in the generalized drive of FIG. 1, are the pitch curves of the sprockets. In the case of belt, band or tape drives, in which the noncircular rotational members 10 and 20 are smooth surfaced rollers or pulleys, then the outer surfaces 11 and 21 of the noncircular members can be the smooth outer surfaces of the rotational members. If the drive is of another kind, say a toothed belt, then these surfaces may be the pitch curves for that particular type of rotational member and flexible endless member. The chain 30 has an upper run 31 that is assumed to be the driving run of the drive illustrated in FIG. 1. A lower run 32 is the "slack" or nondriving run of the chain.

In FIG. 1:

$O_1$, $O_2$ denote the "centers" of sprockets 1, 2, respectively, which is to say the locations of the axes about which the sprockets rotate.

$T_1$, $T_2$ denote the points of tangency between the upper, tangent run $T_2T_1$ of the taut endless member and the pitch curves of the sprockets 1, 2, respectively.

$V_1$, $V_2$ denote the velocities of the points $T_1$, $T_2$ on sprockets 1, 2 respectively.

$\omega_1$ $\omega_2$ denote the angular velocities of sprockets 1, 2, respectively, positive being counterclockwise (C.C.W.).

$\theta_1$, $\theta_2$, denote the angular displacements of sprockets 1, 2, repectively, measured C.C.W. from $\overline{O_1O_2}$, the line connecting centers $O_1$ and $O_2$ in the direction from $O_1$ to $O_2$.

$\alpha_1$, $\alpha_2$ denote the angles between velocity vectors, $\overrightarrow{V_1}$, $\overrightarrow{V_2}$, and the directed span, $\overrightarrow{T_2T_1}$ measured C.C.W. from $\overrightarrow{V_1}$ and $\overrightarrow{V_2}$ to $\overrightarrow{T_2T_1}$.

V denotes the component of belt velocity in the direction of the upper tangent vector $\overrightarrow{T_2T_1}$.

P1, P2 denote the normals from points $O_1$ and $O_2$ to tangent $T_2T_1$, or its extension.

I denotes the points of intersection of $O_1T_1$ and $O_2T_2$.

The Angular Velocity Ratio of the Noncircular Chain Drives

From FIG. 1, it can be seen:

$$V_1 \cos\alpha_1 = V_2 \cos\alpha_2 = V. \quad [1]$$

$$\text{Hence } \frac{V_1 \cos\alpha}{\omega_1} = \frac{1}{p_1}\frac{V}{} = \frac{V}{p_1}, \quad [2]$$

$$\text{and } \omega_1 = \frac{V_2 \cos\alpha_1}{p_2} = \frac{V}{p_2}, \quad [3]$$

$$\text{whence } \frac{\omega_1}{\omega_2} = \frac{p_2}{p_1} = \frac{d\theta_1}{d\theta_2}. \quad [4]$$

Hence, we have theorem 1.

Theorem 1 - The angular velocity ration $W_1/W_2$ of the sprockets is equal to the inverse ration $P_2/P_1$ of the normals from the sprocket centers to the span.

The Instant Center in Noncircular Chain Drives

Figure 2:
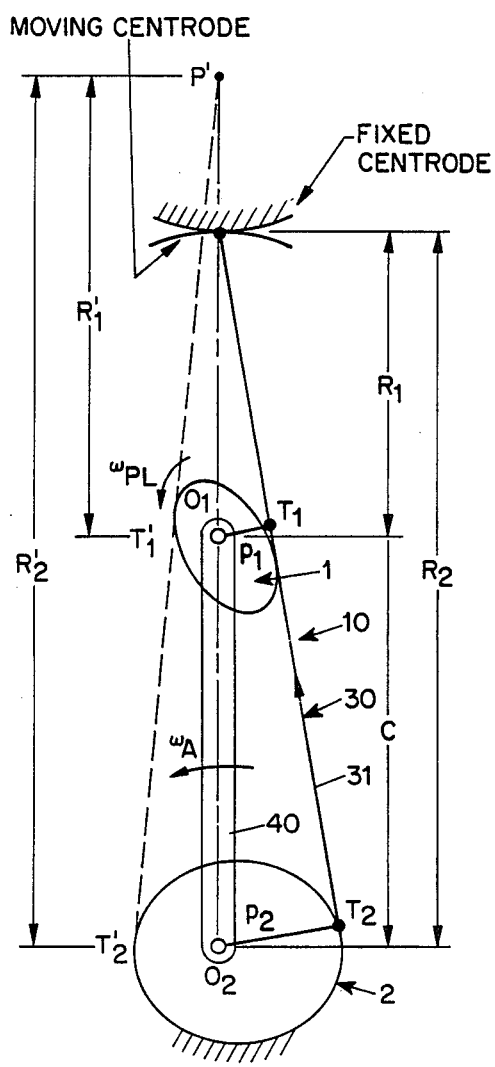
FIG. 2 is a further diagrammatic illustration of the generalized noncircular drive of FIG. 1 and shows the drive with the driven member stationary for the purpose of analysis of the relative motion of the component parts.

To facilitate analysis of the motion of the sprocket 10 relative to the sprocket 2 in the chain drive shown in FIG. 1, FIG. 2 shows the drive with driven sprocket 2 fixed, the arm 40 ($O_1O_2$) now rotating C.C.W. about $O_2$, and the span 31 driving. The angular-velocity relationships between sprocket 1, arm 40, and sprocket 2, can be determined as in planetary gearing from the following table, considering the stationary sprocket 1 as the sun, and the moving sprocket 2 as the planet:

TABLE 1
Angular Velocities in Planetary Operation of Chain Drive

| Angular Displacement | Sun | Planet ($\omega_{PL}$) | Arm ($\omega_A$) |
|---|---|---|---|
| Motion with arm | $\omega_A$ | $\omega_A$ | $\omega_A$ |
| Motion relative to arm | $-\omega_A$ | $(-\omega_A)\frac{p_2}{p_1}$ | 0 |
| Sum (= actual motion) | 0 | $\omega_{PL} = \left(1 - \frac{p_2}{p_1}\right)\omega_A$ | $\omega_A$ |

Hence, the angular velocity, $\omega_{PL}$, of the planet is given by $$\omega_{PL} = \omega_A (1 - p_2/p_1). \quad [5]$$

P denotes the point of contact between the centrodes of the relative motion of the sprockets, as shown in FIG. 2. Since the velocity of arm 40 is perpendicular to line $O_1O_2$, point P must be collinear with line $O_1O_2$. Referring to FIG. 2, let $\vec{V_p}$ = velocity of point of contact P between centrodes;

$\vec{V_{01}}$ = velocity of center, $O_1$, of sprocket 1;

and $\vec{V_{02}}$ = velocity of center, $O_2$, of sprocket 2.

Then $\vec{V_p} = 0$, $\vec{V_{01}} + \vec{V_{p/01}} = 0$, $\quad [6]$ where, $\vec{V_{p/01}}$ denotes the velocity of P relative to $O_1$.

It follows from [6] that
$$\vec{V_p} = \omega_A C + R_1 \omega_{PL} = 0, \quad [7]$$

where $\omega_A$ = angular velocity of "arm" $O_1O_2$, $\omega_A = C$ = angular velocity of "arm" $O_1O_2$, $C$ = center distance, $O_1O_2$, and $R_1 = \vec{P_{o1}}$.

Solving [7] for $R_1$:

$$R_1 = \frac{-\omega_A C}{-\omega_{PL}}. \quad [8]$$

Substituting [5]

$$R_1 = \frac{-\omega_A C}{\omega_A(1 - p_2/p_1)} = \frac{p_1 C}{p_2 - p_1}. \quad [9]$$

If, however, P is the point of intersection of lines $O_1O_2$ and $T_1T_2$, then from similar triangles in FIG. 2:

$$p_1/p_2 = \frac{R_1}{R_1 + C}, \quad [10]$$

$$\text{or } R_1 = \frac{p_1 C}{p_2 - p_1}, \quad [11a]$$

which coincides with [9].

$$\text{Hence } R_2 = R_1 + C = \frac{C p_2}{p_2 - p_1}, \text{ or } R_2 - R_1 = C \quad [11b]$$

and: $R = p_1/p_2 =$
where $O_1$, $O_2$, denote the sprocket rotations, and $R_1(O_1)$, $R_2(O_2)$ the polar coordinates of the sprocket pitch curves.

The same type of analysis is applicable when the left span $T'_1T'_2$ of FIG. 2 is driving. However, the point of intersection, P', of $T'_1T'_2$ with $O_1O_2$ does not in general coincide with P. It follows from equation [11c] that the angular-velocity ratio of the sprockets when the left span is driving is not in general the same as that when the right span is driving. Hence, for a taut chain drive, it is necessary that points P and P' be coincident at all times. Summarizing, the following theorem has been established:

Theorem 2 - In a taut chain drive the instant center of the relative motion of the sprockets is the point of intersection of the two chain spans and this point lies on the line of centers, $O_2O_2$.

The Analogy Between Noncircular Gears and Noncircular Chain Drives

Suppose, however, that axes $O_1$ and $O_2$ of FIG. 2 were the axes of rotation of two noncircular gears having the same absolute angular displacements as the sprockets. The equations defining these gears are well known. See, for instance the above-referenced Product Engineering article by Bloomfield. They are precisely the equations [11b,c] just derived for the noncircular sprockets, except that $R_1$, $R_2$ now refer to the pitch radii of the noncircular gears. It follows that the two relationships are in fact identical, recognizing the fact that in both cases radii $R_1$ and $R_2$ are measured from the axes of rotation to the instant center of the relative motion between the rotating members.

Summarizing, this provides the following theorem:

Theorem 3 - To any chain drive with noncircular sprockets there corresponds a unique internal and external noncircular gear pair having the same center distance and the same absolute angular velocity relationship between the paired rotational members and the radii from the centers of rotation to the instant center of the relative motion of the noncircular members.

Basic Principles of the Technique for Synthesizing the Sprocket Pitch Curves

Figure 3A:
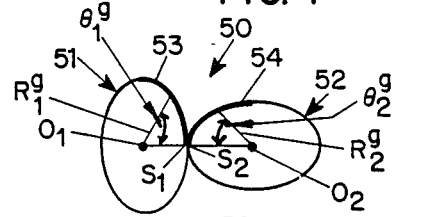
FIG. 3-e diagrammatic illustrations of an externally meshed noncircular gear pair and represent manipulative steps for establishing a noncircular chain, tape or belt drive of similarly shaped noncircular rotational members.
Figure 3B:
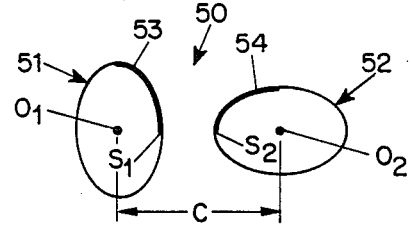
Figure 3C:
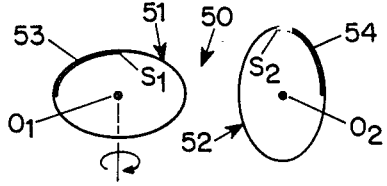
Figure 3D:
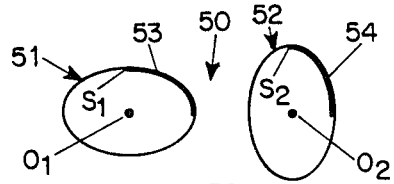
Figure 3E:
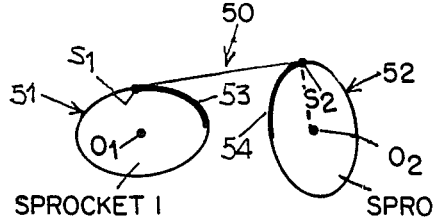

The kinematic correspondence established above between noncircular sprockets and noncircular gears can be used to fabricate noncircular chain and sprocket drives. Given a desired relationship between the sprocket rotations of a variable ratio chain drive, one synthesizes, using for example the techniques of standard texts or Bloomfield, supra., the pitch curves of a noncircular gear pair (either externally or internally meshing) satisfying the desired angular relationship. Several examples appear below. FIG. 3a illustrates the pitch curves of a generalized, externally meshing, noncircular gear pair 50. The sectors 53 and 54, shown in heavy solid lines in the figure, identify mating arcuate portions of the pitch curves of the two gears 51 and 52, respectively. These sectors are to facilitate illustration of the manipulative steps that follow. Points $S_1$ and $S_2$ are the corresponding points of contact on the gears. In the algorithm, which is embodied in Fortran in the program attached as Appendix A, the desired functional relationship is input 1. The gears are generated and the gears are separated to a desired sprocket center-to-center distance as shown in FIG. 3b. They are then rotated until points $S_l$ and $S_2$ are vertically above gear "centers" $O_1$, $O_2$, the points (or axis locations) about which the gears rotate. The gears are now in the positions illustrated in FIG. 3c. Gear 51 is then rotated 180°, i.e., flipped or turned over, about axis $O_1S_1$. The gears are then in the positions shown in FIG. 3d. The gears are rotated slightly, until points $S_1$ and $S_2$ are the points of tangency on a common tangent $S_1S_2$ to the pitch curves of the two gears, as illustrated in FIG. 3e. The tangent is the center line of a taut driving run of a sprocket drive thus defined.

Figure 4A:
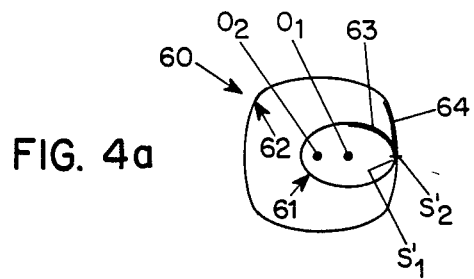
FIG. 4-d are diagrammatic illustrations of an internally meshed noncircular gear pair and represent manipulative steps for establishing a noncircular chain, tape or belt drive of similarly shaped noncircular rotational members.
Figure 4B:
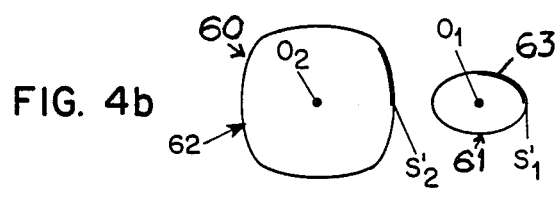
Figure 4C:
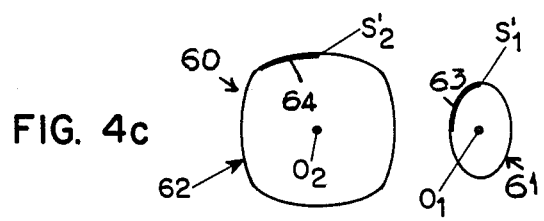

The procedure using internally meshing, noncircular gears as the starting point is similar. These are shown in FIGS. 4a–4d. The gears are designed to provide the sought after functional relationship using known techniques, typified again by Bloomfield, supra., for example. The technique differs from that just described for externally meshing gears in that neither gear 62 or 61 in FIG. 4 is turned over. In the gear pair 60, the gears 61 and 62 are shown contacting at points $S'_1$ and $S'_2$ in FIG. 4a. The pitch curve of gear 62, shown in FIGS. 4a–4d, it should be understood, is that of the internally geared surface of that gear. The desired center-to-center distance C of FIG. 4b is established by moving the gears apart. The interior shape of the gear 62 becomes the external shape of the pitch curve of the corresponding sprocket. The gears are rotated to bring $S'_1$ over $O_1$ and $S''_2$ over $O_2$, as before. The gears are then as shown in FIG. 4c. The gears are rotated as needed to enable a common tangent $S'_2S'_1$, being established. This tangent, FIG. 4a, is representative of the chain center line.

The sequence of contacting point pairs on the respective sprockets are now as nearly as possible identical with those on the noncircular gears from which they were derived. One can now begin to simulate operation of the drive of either FIG. 3e or FIG. 4d with, say, the upper tangent driving, again preferably by computer, as is facilitated by the appendix/program. If the distance $C_1$ between centers $O_1$ and $O_2$ in either FIGS. 3e or 4d, were infinite, the conditions of Theorem 2 would be satisfied, inasmuch as any three parallel lines meet at a point at infinity. Thus we can summarize the preceding consideration as follows:

Theorem 4 - A noncircular sprocket chain drive derived from noncircular gear pitch curves, as described with respect to FIG. 3 or FIG. 4, and with infinite center distance, synthesizes the desired relationship between sprocket rotations with a chain drive which is always taut.

Application to Chain Drive Formulation

If the center distance is finite, however, the slack in the chain will not in general vanish. Provided, however, that the ratio of center distance to average sprocket diameter is sufficiently large so that the angularity of the chain span does not vary too much, the variation in slack can be remarkably small, especially in the case of variable ratio drives with multiply periodic angular velocity ratios.

For a given functional relationship between sprocket rotations, after having synthesized and reoriented a noncircular gear pair at the desired center distance and sprocket shapes as above, sprocket sizes are uniformly reduced until the ratio of average sprocket radius to center distance is approximately as desired. Then chain operation is simulated, with, for example, the upper tangent or chain run driving. The sprocket displacement function is determined, either via the instantaneous angular velocity ratio, or via other known kinematic characteristics. As described more fully below, the error between desired and generated angular displacement functions is then computed for an entire cycle of operation of the drive. By "cycle of operation" is meant one entire period of the operation of a drive that has a periodic function. Depending on the function, this could mean less than one, or more than one complete rotations of either or both sprockets, and it could mean less than or more than one complete excursion of the chain.

Unless the displacement function error throughout a cycle of operation is below a specified limit, a new noncircular gear pair is generated to endeavor to bring the drive closer to the design functional relationship. An effective procedure for determining the new noncircular gear pair is to assume that the difference between the displacement functions of the previous ($i^{th}$) gear pair and the new (($i+1$)$^{st}$) gear pair should be equal to the observed error, which is to say the difference between design displacement function and the displacement function generated, as observed during the analysis of the previous ($i^{th}$) design. With displacement function revised by addition of the error previously noted, this teen becomes the starting part for a new iteration of the design procedure (($i+1$)$^{st}$). Based on this, a new gear pair is developed, again as in the texts or the Bloomfield article, and again the gears are manipulated, and the resulting sprockets are analytically driven through a cycle of operation, with the upper chain run driving. This process is repeated until the maximum displacement error between ideal generated sprocket displacement functions is less than a predetermined limit. The chain slack is analyzed. For a cycle of operation, the length of a perfectly taut chain, i.e. one in which there is no slack, is determined for each position of the sprockets. The minimum perfectly taut chain length is subtracted from the maximum perfectly taut chain length. The result is the variation in slack throughout one cycle of operation. If this exceeds a predetermined maximum, the same procedure of iterative revision of the sprockets can be repeated with the lower span driving. The iterative procedure is repeated with alternate spans driving until the functional error and slack variation are within limits.

Pseudocode

The following pseudocode utilizes a relatively simple approximation for the pitch curves.

Let $\theta_{2i} = f_{ui}(\theta_1)$, i = 0,1,2, .... [A1] = angular displacement of sprocket #2 (driven sprocket) when upper tangent is driving, $i^{th}$ iteration.

$f_{ui}(\theta_1)$ = functional relation between sprocket rotations ($\theta_1$, $\theta_2$) when upper tangent is driving, $i^{th}$ iteration.

$\Delta^u{}_{2i}$ = angular error, $i^{th}$ iteration, in position of driven sprocket, when upper tangent is driving.
$$\Delta^u{}_{2i} = \theta_{20}(\theta_1) - \theta^u{}_{2i}(\theta_1) \; i=0,1,2,\ldots, \quad [A2]$$

where $\theta_{20}(\theta)$ = desired functional relation between sprocket rotations, i.e., angular displacements, $\theta^g{}_{2i}(\theta_1)$ = function generated by noncircular gear pair, $i^{th}$ iteration, $\theta_1$ = rotation or angular displacement of the drive sprocket (sprocket #1), $\theta_2$ = rotation or angular displacement of the driven sprocket (sprocket #2), C = center distance.

$R^g{}_1$ = active pitch radius of a first gear of a noncircular gear pair.

$R^g{}_2$ = active pitch radius of a second gear of a noncircular gear pair.

$\theta^g{}_1$ = the polar angle to $R^g{}_1$ measured counterclockwise on the first gear of the noncircular gear pair from the line $O_1O_2$ between the points about which the noncircular gears rotate as shown in FIG. 3a.

$\theta^g{}_2$ = the polar angle to $R^g{}_2$ measured clockwise on the second gear of the noncircular gear pair from the line $O_1O_2$ between the points about which the noncircular gears rotate as shown in FIG. 3a.

$C^g$ = the center distance $O_1$ to $O_2$ of the gear pair as shown in FIG. 3a.

Design procedure

1. First using conventional techniques, a noncircular gear pair is designed having the functional relationship desired for the ultimate sprocket drive. The desired functional relationship can and often will be a desired angular relationship between sprockets. In which case, it is given that the desired functional relationship:

$\theta^g{}_{2i}(\theta_1) = f(\theta_1)$, say, for $\theta_1$ = j (degrees), J = 1°, 2° ,...., 360° and center distance, C. Determine the pitch curves, [$R^g{}_{1i}(\theta_1)$ and $R^g{}_{2i}(\theta_2)$] of the noncircular gear pair as follows:

$$R_1{}^g(\theta_1{}^g) = \frac{C^g f(\theta_1{}^g)}{1 + f(\theta_1{}^g)} \text{ as in Bloomfield,} \quad [A3]$$

and $R^g{}_2(\theta^g{}_1) = C^g - R^g{}_1(\theta^g{}_1)$, [4]

where the first derivative, $$f'(\theta_1{}^g) \simeq \frac{f(\theta_1{}^g + \Delta\theta_1{}^g) - f(\theta_1{}^g - \Delta\theta_1{}^g)}{2\Delta\theta_1{}^g}. \quad [A5]$$

Alternatively, various techniques can be used to refine the gear design, to the extent desired. For example, the pitch curves can be approximated by polygons or by continuous curves with continuous derivatives, such as polynomial approximations, spline functions or otherwise.

Moreover, although the functional relationship is expressed above in terms of angular displacement $\theta$, the gear pair design can be determined based upon, for example, the functional relationship expressed in terms of, say, angular velocity $\omega$, again, as in Bloomfield, supra. 2. To reorient the gears to the positions thereof illustrated in FIG. 3(d):

Let $R^q{}_{1i}(\theta^q{}_{1i}) \rightarrow R^q{}_{1i}(-90° + \theta^q{}_{1i}); 0 \leq \theta^q{}_{1i} \geq 180°$ $R^q{}_{1i}(\theta^q{}_{1i}) \rightarrow R^q{}_{1i}(\theta^q{}_{1i} - 270°); 180° \leq \theta^q{}_{1i} \leq 360°$ $R^g{}_{2i}(\theta^q{}_{1i}) \rightarrow R^g{}_{2i}(90° + \theta^q{}_{1i}); 0° \leq \theta^q{}_{1i} \leq 270°$ and $R^g{}_{2i}(\theta^q{}_{1i}) \rightarrow R^g{}_{2i}(\theta^q{}_{1i} - 270°); 270° \leq \theta^q{}_{1i} \leq 360°$.

Reduce the pitch curves to the desired ratio of center distance to average sprocket pitch diameter. The initial configuration and distance between the sprockets have now been established. They are, as in FIG. 3d, nearly in their relative rotational position to be connected by the chain. In this case the sprockets have been separated by the reduction in size of the gear originally designed to have the same center distance C as that desired for the chain drive. 3. To determine initial tangent and exact starting position of sprockets, as in FIG. 3e for example, (i) Let $\theta_{li} = \theta_{2i} = 90°$.

Figure 5A:
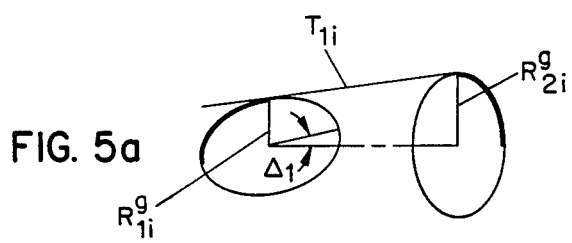
FIG. 5a and b are diagrammatic illustrations of the manner in which initial positioning of the noncircular members and the endless member of the drive of FIGS. 3a–e is accomplished for use in computer generation of the noncircular drive.

(ii) Increment $\theta_{li} \rightarrow \theta_{li} + \Delta_1$, such that tangent, $T_{li}$, of sprocket 1 (gear 51) at $R^g{}_{2i}$ just intersects FIG. 5(a). $T_{li}$ is not yet tangent to sprocket 2, FIG. $5a_1$.

Figure 5B:
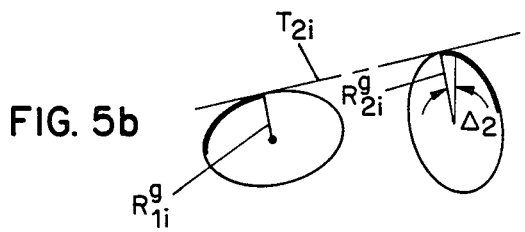

(iii) Increment $\theta_{2i}$ 02i $+\Delta_2$, such that tangent, $T_{2i}$, of sprocket 2 (gear 52) at $R^g{}_{2i}$ just intersects $R^g{}_{li}$, as in FIG. 5b. $T_{2i}$ is not yet tangent to sprocket 1, FIG. $5b_1$.

Iterate until the initial tangent is determined, i.e. until all points on the pitch curve (other than the points of tangency) lie below the upper tangent, measuring normal to the tangent. The initial sprocket drive, upper run driving, FIG. 3e, has now been accomplished. This will be used for the first, i=0, analytical operation of the drive through at least one complete cycle.

4. Sprocket 1 is rotated in increments j of 1° from the starting position and locations of tangents are determined as in step 3.

5. Coordinates are determined for point of intersection, $P_j$, FIG. 2, of common tangent with $0_1 0_2$ for j=1°, 2°, ... at least through a cycle of operation.

6. Determine $$\left(\frac{d\theta_2}{d\theta_1}\right)^u_j = \frac{P_jO_j}{P_jO_2}, j = 1°, 2°, \ldots \quad [A6]$$

through at least a cycle of operation, and (via numerical integration) determine the angular displacements $\theta_{2j}(\theta_1)$ of sprocket 2 for each of $j = 1°, 2°, \ldots$ through a cycle of operation.

7. Knowing the tangent points for taut upper and lower runs, determine the length of upper and lower spans and the lengths of the portions of chain that engage the sprockets, and hence determine the length of a taut chain belt for each $j = 1°, 2°, \ldots$ through a cycle of operation. Determine by subtraction of minimum from maximum the excess chain length. Determine functional relationship error, $\theta_{20} - \theta^u_{2i}(\theta_1)$.

8. Increment $i \to (i+1)$ with $$\theta^g(i) = {}^g 2i + \theta_{20} - \theta^u 2i (\theta_1) \quad [A7]$$

and iterate until $$\theta^u_{2i}(\theta_1) - \theta_{20}(\theta_1) \geq \epsilon, \quad [A8]$$

where $\epsilon$ is a predetermined error bound.

9. If the excess chain length exceeds a predetermined limit, return to step 1 with lower span driving and proceed through steps 1–9.
10. Alternate between upper and lower span driving, redesigning the gears and then the sprockets as above, until excess chain length is minimized.
11. Ratio size of system uniformly so that the two pitch curves correspond to an integral number of teeth. Of course this step is unnecessary when the above procedure is being applied to a belt or band drive with smooth rollers or pulleys.

Note that steps 10–11 are optional depending on desired degree of reduction of chain slack. The steps of the above pseudocode are accomplished in Fortran in the attached program of Appendix A. The flow chart of FIG. 13 is illustrative of the overall procedure. Although the above evaluations for functional relationships, i.e. displacement, error and slack is said to cover a whole cycle of operation, symmetry may make evaluation through a lesser portion of the cycle sufficient.

Applications

The process of making chain drives as described enables design of bicycle drives providing a variable-ratio drive for optimizing short term power or long-term power for aerobic exercise purposes. Such a bicycle drive 70 is shown schematically in FIG. 6. A pedal assembly has typical pedals 71, attached in driving relation to a drive sprocket 72. The drive sprocket 72 is connected to a driven sprocket 73, via a chain 75, entrained about the two sprockets. A bicycle frame 76 establishes the center-to-center distance, called C above. Of course, the driven sprocket is connected to apply power to the rear wheel. The pitch curve of the drive sprocket 72 is twice as long as that of the driven sprocket 73.

Figure 7D:
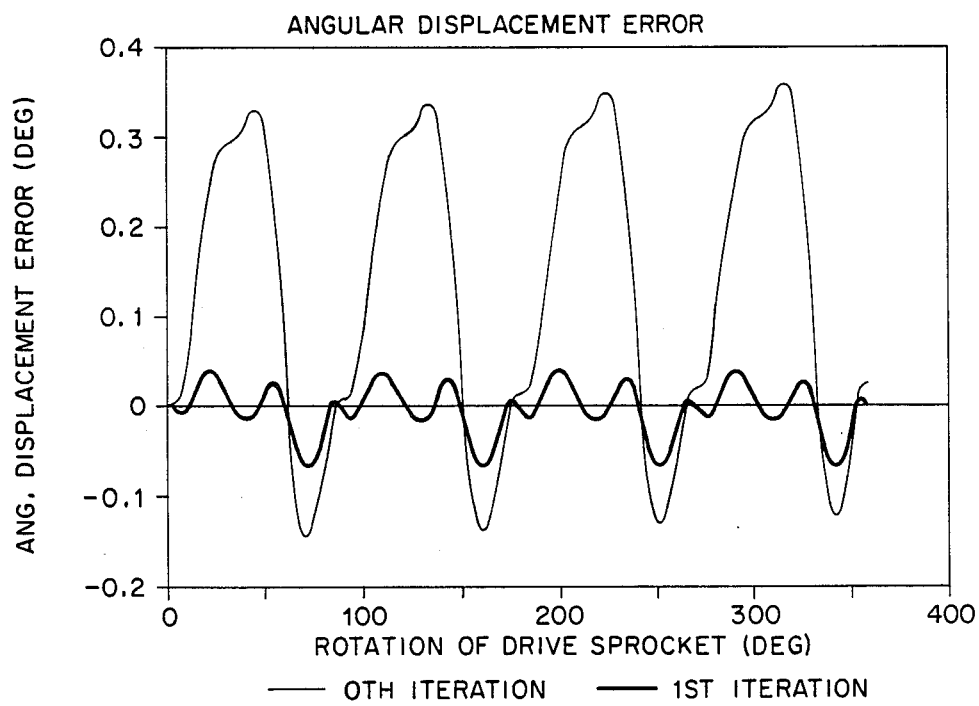

In comparison with a representative constant bicycle reduction ratio of 40:18, for example, the speed-ratio variation obtained in the variable-ratio drive of noncircular sprockets provides an opportunity for maximizing power during that part of the pedaling cycle for which the mechanical advantage is a maximum, or for other desired performance characteristics. FIG. 7a illustrates schematically and more accurately pitch curves 77 and 78 and chain span center line 79 of the noncircular chain drive 70 of FIG. 6, with the sprockets 72 and 73 based on fourth and second order ellipses satisfying the displacement relationship for a fourth and second order noncircular gear pair. The center-to-center distance is 17.5″, in all of the following examples, and the ratio of center distance to average sprocket diameter is 4.3. FIG. 7b shows the corresponding angular velocity variation, which is quadruply periodic in the rotation of the fourth-order gear, the variation being nearly sinusoidal. FIG. 7c shows the corresponding variation in taut chain length, which is less than one thousandth of the length of the chain. The angular displacement error is shown in FIG. 7d, both initially based on the original gear pair design ($0^{th}$ iteration) and after one design revision (1st iteration). The 1st iteration maximum angular displacement error $\geq 0.07°$.

FIGS. 8,a,b,c,d illustrate the results for a noncircular chain drive 80 with sprockets 81 and 82 based on second-order ellipses as shown in FIG. 8a. The difference between the angular velocity ratio is too small to be appreciable in a plot the scale of FIG. 8b. Slack variation of little more than ¼ taut chain length fluctuation out of an overall chain length of slightly over 46 inches is apparent from FIG. 8c. And the considerable reduction in angular displacement error achieved with just one iteration of the design procedure (one revised set of noncircular gears) is illustrated in FIG. 8d.

A drive 90 with sprockets 91 and 92 based on second-order and first-order ellipses is illustrated in FIG. 9a. Again, angular velocity ratio error is too small to be apparent on the graphical illustration of FIG. 9b. Again, the variation in taut chain length over the course of a cycle of operation, FIG. 9c is slightly in excess of a quarter inch for a total chain length of about 46 inches. The dramatic reduction in displacement error after one iteration and the appreciable further reduction by a second iteration appears in FIG. 9d. Tables 1 a,b,c summarize the chain drive characteristics of the drives of FIGS. 7a, 8a and 9a.

TABLE 1A

| | | | |
|---|---|---|---|
| CHARACTERISTICS OF NC GEAR PAIRS GENERATING DESIRED ANGULAR-DISPLACEMENT FUNCTION | | | |
| NC GEAR PAIR TYPE | CENTER DISTANCE | MAX/MIN RADII, LARGER GEAR | MAX/MIN RADII, SMALLER GEAR |
| 4TH AND 2ND ORDER, ELLIPTICAL | 1.392″ | 0.972″/0.882″ | 0.510″/0.420″ |
| 2ND AND 2ND ORDER ELLIPTICAL | 0.930 | 0.510″/0.420″ | 0.510″/0.420″ |
| 2ND AND FIRST ORDER ELLIPTICAL HARMONIC-MOTION | 1.470″ | 1.110″/0.830″ | 0.640″/0.360″ |

TABLE 1A-continued
CHARACTERISTICS OF NC GEAR PAIRS GENERATING DESIRED ANGULAR-DISPLACEMENT FUNCTION

| NC GEAR PAIR TYPE | CENTER DISTANCE | MAX/MIN RADII, LARGER GEAR | MAX/MIN RADII, SMALLER GEAR |
| --- | --- | --- | --- |
| GENERATOR GEARS | | 5.370"/4.731" | 5.290"/4.650" |

TABLE 1B
NC SPROCKET CHARACTERISTICS

| NC GEAR PAIR TYPE | CENTER DISTANCE | MAX/MIN RADII, DRIVE SPROCKET | MAX/MIN RADII, DRIVE SPROCKET |
| --- | --- | --- | --- |
| 4TH AND 2ND ORDER, ELLIPTICAL | 17.5" | 2.842"/2.579" | 1.491/1.227" |
| 2ND AND 2ND ORDER ELLIPTICAL | 17.5" | 2.232"/1.836" | 2.233"/1.838" |
| 2ND AND FIRST ORDER ELLIPTICAL | 17.5" | 2.465"/1.844" | 1.420"/0.799" |
| HARMONIC-MOTION GENERATOR | 17.5" | 2.187"/1.921" | 2.148"/1.889" |

TABLE 1C
NC CHAIN DRIVE CHARACTERISTICS

| ANGULAR DISPLACEMENT FUNCTION TYPE | MAX ANGULAR DISPLACEMENT ERROR (DEGREES) | E/L  E = MAX. EXCESS CHAIN LENGTH ($E_{MIN} = 0$)  L = CHAIN LENGTH) | MAX. SAG. |
| --- | --- | --- | --- |
| 4TH AND 2ND ORDER, ELLIPTICAL | $\leq 0.07°$ | 1/1075 | 0.51" (2.93%) |
| 2ND AND 2ND ORDER ELLIPTICAL | $\leq 0.04°$ | 1/184.3 | 1.28" (7.3%) |
| 2ND AND FIRST ORDER ELLIPTICAL | $\leq 0.09°$ | 1/34.6 | 2.90" (16.6%) |
| HARMONIC-MOTION GENERATOR GEARS | $\leq 0.01°$ | 1/917.9 | 0.58" (3.3%) |

In these chain drives it can be observed that the displacement error even without iteration is often less than one degree. The known displacement equations used for the initial design of the noncircular gears that serve as the starting point from which the sprockets for each of the foregoing exemplary sprocket shapes are as follows.

The Pitch Curves $[R_1(\theta^G_1)]$ of 1st, 2nd and 4th Order Noncircular Driven Gears:

For the 1st order elliptical drive gear:

$$R_1 = \frac{b^2}{a(1 + \epsilon\cos\theta_1^g)},$$ [B1]

$$\text{where } \epsilon = \text{eccentricity} = \sqrt{1 - \frac{b^2}{a^2}},$$ [B2]

$a$ = semi-major axis, and $b$ = semi-minor axis.

For the 2nd-order elliptical drive gear:

$$R_1 = \frac{2R_{max}R_{min}}{(R_{max} + R_{min}) - (R_{max} - R_{min})\cos 2\theta_1^g},$$ [B3]

where $R_{max}$ = max. radius, $R_{min}$ = min. radius.

For the 4th order elliptical drive gear:

$$R_1 = \frac{2rD}{(r + 1)^2 + (r^2 - 1)\cos 4\theta_1^g},$$ [B4]

where $r = R_{max}/R_{min}$, $D = R_{max} + R_{min}$.

The above is expressed generally as:

Drive gear: $R_1 = f(\theta^g_1)$ [5]

The pitch curve for the driven gear is:

$R_2(\theta^g_2) C - R_1 C - f(\theta^g_1),$ [6]

where C - center distance. For given values of C and $R_1$, and drive gear rotation ($\theta_1$), one can obtain the displacement equation of the driven gear by solving for $\theta_2$ and substituting $*_1$ from eq. [B8] below with 4th and 2nd order drive gears, as follows:

$$\theta_2 = \frac{1}{N} \frac{P_1^* - P_2^*}{\sqrt{P_2^{*2} - 1}} \tan^{-1} \frac{(P_2^* - 1)\tan N\theta_1}{\sqrt{P_2^{*2} - 1}} \quad [B7]$$

where N =1, for second-order gears, or 2, for fourth-order gears.

$$P_1^* = \frac{R_{max} + R_{min}}{R_{max} - R_{min}} \text{ (for 2d-order gear)}$$
$$\text{or } \frac{(r+1)^2}{(r^2-1)} \text{ (for 4th-order gear)}$$

and $P_2^* = \frac{C(R_{max} + R_{min}) - 2R_{max}R_{min}}{(R_{max} - R_{min})^2}$ (for 2nd-order gear)

or $\frac{C(r+1)^2 - 2rD}{C(r^2-1)}$ (for 4th-order gear)

It should be noted that, due to symmetry, equation [B7] is an example of an equation that can be evaluated only for the range $\leq \theta_1 \leq 90°$, rather than for a full cycle of operation, to arrive at displacement error and slack in the noncircular drive design. A further example of an application of a noncircular drive is to obtain a frequently desired objective in the general machinery field, the generation of a purely sinusoidal reciprocating or oscillating motion. For this purpose one modifies the standard slider-crank mechanism by adding a noncircular chain drive 100, as shown in FIG. 10. The displacement function that needs to be generated by the noncircular gears is derived as follows:

$$x = r\cos\theta_2 + l[\cos\phi \quad [C1]$$

$$r\sin\theta = 1\sin\phi \quad [C2]$$

By differentiation, $$r\dot\theta_2\cos_2 = l\dot\phi\cos\phi \quad [C3]$$

$$\therefore x = r\cos\theta_2 + l\sqrt{1 - \frac{r^2}{l^2}\sin^2\theta_2} \quad [C4]$$

Let $x - x_{ideal} = r\cos\theta_1 + l^*$ (say), [C5]

where $l^*$ is a constant.

$\therefore r\cos\theta_2 + l\cos\phi = r\cos\theta_1 + l^*$. [C6]

Substituting [C2] into [C6], $$r\cos\theta_2 + l\sqrt{1 - \frac{r^2}{l^2}\sin^2\theta_2} = r\cos\theta_1 + l^* \quad [C7]$$

When $\theta_2 = 0$, $\theta_1 = 0$.

Hence, $l = l^*$ [C8]

From [C7] we have $$\cos\theta_2 = \cos\theta_2 + \sqrt{\frac{l^2}{r^2} - \sin^2\theta_2} - \frac{l}{r} \quad [C9]$$

$$= \cos\theta_2 + \frac{l}{r}\sqrt{1 - \frac{r^2}{2l^2}(1 - \cos2\theta_2)} - \frac{l}{r} \quad [C10]$$

$$\therefore \cos\theta_1 = \cos\theta_2 - \frac{l}{r}\left\{1 - \sqrt{1 - \frac{r^2}{2l^2}(1 - \cos2\theta_2)}\right\} \quad [C11]$$

$$\therefore \cos\theta_1 = \cos\theta_2 - \frac{l}{r}\left\{1 - \sqrt{1 - \frac{r^2}{l^2}\sin^2\theta_2}\right\}. \quad [C12]$$

An approximate formula can also be obtained as follows:

$$\cos\theta_1 = \cos\theta_2 - \frac{l}{r} + \frac{l}{r}\sqrt{1 - \frac{r^2}{l^2}\sin^2\theta_2} \quad [C13]$$

$$\simeq \cos\theta_2 - \frac{l}{r} + \frac{l}{r}\left(1 - \frac{r^2}{2l^2}\sin^2\theta_2\right). \quad [C14]$$

Setting $\sin^2\theta_2 = \frac{1}{2}(1 - \cos2\theta_2)$, this reduces to [C15]

$$\cos\theta_1 \simeq \frac{-r}{4l} + \cos\theta_2 + \frac{r}{4l}\cos2\theta_2$$

Higher harmonics can be determined, if desired, by expanding the square root term in eq. [C13] in a power series, if desired.

As can be seen, the resulting piston displacement is a pure harmonic function of crank rotation and the noncircular sprockets have very favorable proportions. Tables, 1a,b,c, summarize dimensional data, angular-displacement errors and chain slack for this case as well. The drive 100 that produces essentially the displacement function of equation [C15] is more precisely shown in FIG. 11a. The angular velocity ratio of the driven sprocket 102 to the drive sprocket 101 is shown in FIG. 11b. The variation in taut chain length appears in FIG. 11c. The angular displacement error for the 0th and for the first iteration is shown in Fig. 11q. And the slider displacement versus drive sprocket rotation appears in FIG. 11e.

Chain Slack

According to the American Chain Association the permissible chain sag (S) should be between 2% and 3% of center distance (C). If E denotes the excess chain length, the sag, S, is determined from the equation:

$$S = \sqrt{0.375 CE}. \quad [12]$$

For the cases considered in tables 1a, b, and c, in which the center distance is 17.5", the excess chain length (E) varies from a minimum of 0.045"(corresponding to a ratio, R, of excess to belt length of 1/1075) for the 4-2 ellipses, to a maximum of 1.287"for the 2:1 ellipses (R=1/34.6), while for the harmonic motion generator the excess length of 0.052" corresponds to a ratio of excess to belt length of R=1/918.

It is readily seen that the 4-2 ellipses and the harmonic generator have the least slack (less than 0.2% of belt length). Considering the ratio changes involved, their periodicity and the ratio of average sprocket size to center distance, this is a remarkably low figure.

Referring to Table 1c, the recommended sag (corresponding to an excess chain length of 2-3% of center distance) is 0.52". The sag for the 4-2 ellipsis and the harmonic motion generator are close to this value, while for the others it is not. The excess chain length, however, now need to be increased so that during operation the chain does not become too tight. According to eq. 12 we can increase the sag in each case so that $E_{min}=0.041$, for example. This then yields the following values for the maximum sag:

4-2 ellipsis: $S=0.751"$; $E_{max}=0.086"$.

2-2 ellipses: $S=1.382"$; $E_{max}=0.191"$.

2-1 ellipsis: $S=2.95"$; $E_{max}=1.328"$.

Harmonic Motion Generator: $S=0.781"$; $E_{max}=0.093"$.

The sag for the 4-2 ellipses and the harmonic motion generator remain reasonably close to the previously listed values. The 4-2 ellipses and the harmonic generator may or may not need a tensioner, (depending on speed and loads). If a tensioner is needed, however, its excursion has been minimized.

Suitable tensioners are known and include a movable mount carrying one or more slack take-up idlers and biased in the slack take-up direction. FIG. 12 illustrates schematically a drive 110 having a simple idler 115 of this kind. Other slack take-up arrangements can be employed with drives embodying the invention. Generally, the greater the rate of change of the drive ratio, the more likely it is that a tensioner will be needed. In any case in which it is desired that chain slack be completely eliminated, regardless of ratio variation, this can be accomplished by the addition of a suitably designed tensioner.

Conclusion

The program that has been developed and that is appended demonstrates the feasibility of designing variable ratio chain drives with minimum slack. Provided the angular velocity variation is not too large and the ratio of average sprocket size to center distance is acceptable, such drives can be designed for a great variety of performance requirements. The attached program has been accomplished in FORTRAN on an IBM P/C AT, and the underlying analogy with noncircular gearing has proven to be remarkably effective in minimizing chain slack.

An average run of the program, simulating drive operation with upper tangent driving and two iterations, takes approximately 5-6 minutes, and in many cases iterations may not be necessary. The algorithm can be used in the design of any application in which a periodic variable ratio is desired. Sprocket geometry is believed sufficiently robust so that, provided the departure from a circular pitch curve is not too great, the conventional method of tooth generation remains applicable, just as in noncircular gearing. Care must be taken that the pitch curves are sufficiently convex so as to prevent disengagement between chain and sprocket and to maintain favorable force transmission. While the chain can be designed to have hunting-tooth engagement with either or both sprockets, the relative position of the sprocket teeth is governed by their periodicity. This invention is applicable to any drive rotational members the pitch curves of which (including smooth outer surfaces of rollers, pulleys, etc.) are noncircular plane curves.

While specific preferred embodiments of the invention have been illustrated and described, it will be appreciated that numerous variations in the drives and methods of this invention can be made without departure from the spirit and scope of the invention as defined in the appended claims.

I claim:

1. A drive having a noncircular rotational driving member, a noncircular rotational driven member spaced from the driving member, an endless, flexible member entrained about the noncircular rotational members to impart driving rotational force from the driving member to the driven member, the spacing, shape and size of the rotational members maintaining the endless member substantially taut for each rotational position of the rotational members about which the flexible member is entrained.

2. The drive according to claim 1 wherein a perfectly taut endless member distance about the rotational members varies less than 5% among the operational rotational positions of the rotational members of the drive.

3. The drive according to claim 1 wherein the noncircular shapes of the rotational members are substantially the shape of the pitch curves of meshed noncircular gears having substantially the functional relationship of the rotational members of the drive.

4. The drive according to claim 3 wherein said rotational members are in a relative rotational position in which points along the circumferences thereof that are connected in driving relation by a run of the endless member correspond substantially to engaging points of like-shaped meshed noncircular gears having substantially the functional relationship of the rotational members of the drive.

5. The drive according to claim 4 wherein the sizes of the rotational members have been proportionately reduced from the sizes of meshed noncircular gears having substantially the functional relationship of the rotational members of the drive, to reduce the inclination of runs of the endless member to thereby reduce variations in slack of the endless member.

6. The drive according to claim 3 wherein said shapes of the rotational members correspond substantially to the shapes of the pitch curves of an externally meshing gear pair having substantially the functional relationship desired for the drive, and in which one of the gears of the pair has been turned over.

7. The drive according to claim 3 wherein said circumferential shapes of the rotational members correspond substantially to the shapes of the pitch curves of an internally meshing gear pair having substantially the functional relationships desired for the drive.

8. The drive according to claim 3 wherein the shapes of the rotational members have been revised from the shapes sufficiently to reduce functional relationship error.

9. The drive according to claim 3 wherein the rotational members are sprockets and the endless member is a chain, the shapes of the rotational members being the shapes of the pitch curves thereof.

10. The drive according to claim 1 wherein the noncircular rotational driving member and the noncircular rotational driven member are the only rotational members of the drive, the spacing, size, and noncircular shapes thereof maintaining the endless member substantially taut throughout the cycle of operation of the drive absent further, intermediate tautness correcting provision.

11. The drive according to claim 1 further comprising a slack take-up means for compensating variations in slack throughout the cycle of operation of the drive, the noncircular members spacing, size and noncircular shape minimizing displacement of the slack take-up means.

12. The drive according to claim 11 wherein the slack take-up means is a displaceable idler engaging the endless member.

13. The drive according to claim 1 wherein at least one of the noncircular members is other than elliptical.

14. The drive according to claim 1 wherein both of the noncircular members are other than elliptical.

15. A method of making a drive including:
(a) determining the operative surface shape of a pair of meshed noncircular gears having substantially the functional relationship preselected for the drive;
(b) forming a pair of rotational members having substantially the shape of the operative surfaces of the gear pair;
(c) supporting the rotational members at centers of rotation a desired distance apart; and
(d) entraining about the rotational members a flexible endless member in driving relation from one rotational member to the other.

16. The method according to claim 15 further comprising the step of orienting the rotational members such that the endless member interconnects, in driving relation, points on the circumference of the rotational members that correspond to contacting points of said noncircular gear pair of substantially the preselected functional relationship.

17. The method according to claim 16 further comprising the steps of determining functional relationship error throughout a cycle of operation of a drive developed in the preceding steps, altering the design functional relationship to compensate for the determined functional relationship error, determining the shape of a pair of noncircular gears having the altered design functional relationship, comparing the original design functional relationship with the functional relationship of a drive having noncircular members of substantially the shape of noncircular gears of the revised design functional relationship throughout at least a portion of a cycle of operation to determine functional relationship error throughout the portion of the cycle, the step of forming a pair of rotational members having substantially the shape of the operative surfaces of the gear pair comprising forming the rotational members with the corrective changes from the shape of the operative surfaces of the original gear pair of the design functional relationship.

18. The method according to claim 14 further comprising the iterative steps of:
(a) determining functional relationship error throughout at least a portion of a cycle of operation of a drive established pursuant to the preceding steps using one run of the endless member in driving relation between the rotational members;
(b) modifying the design functional relationship;
(c) determining the shape of a noncircular gear pair having the modified design functional relationship;
(d) further determining functional relationship error throughout at least a portion of a cycle of operation of the drive, and ending the iterative steps when the functional relationship error is within predetermined bounds.

19. The method according to claim 18 further comprising the step of determining the variation in slack throughout at least a portion of a cycle of operation of the drive at least when the functional relationship error is within predetermined bounds, and when the determined variation in slack exceeds a predetermined limit therefor, determining functional relationship error throughout at least a portion of a cycle of operation of the drive with the other run of the endless member in driving relation between the rotational members, and repeating with the other run of the endless member in driving relation the iterative steps of:
(a) further modifying the design functional relationship;
(b) determining the shape of a noncircular gear pair having the further modified design functional relationship;
(c) further determining functional relationship error throughout at least a portion of a cycle of operation of the drive, and ending this set of iterative steps when the functional relationship error is within predetermined bounds.

20. The method according to claim 19 further comprising the step of:
(a) again determining the variation in slack throughout at least a portion of a cycle of operation of the drive, and when the slack exceeds a predetermined limit therefor, again determining functional relationship error throughout at least a portion of a cycle of operation of the drive the one run of the endless member again in driving relation between the rotational members, and repeating the iterative steps further modifying the design functional relationship;
(b) determining the shape of a noncircular gear pair having the further modified design functional relationship;
(c) further determining functional relationship error throughout at least a portion of a cycle of operation of the drive, and ending this set of iterative steps when the functional relationship error is within the predetermined bounds.

21. The method according to claim 20 further comprising alternately repeating each of the said sets of iterative steps with first the one and then the other of the runs of the endless member in driving relation between the rotational members until the slack is within said predetermined limit and the functional relationship error is within said predetermined bounds.

22. The method according to claim 19 wherein the step of determining the variation in slack comprises calculating the length of perfectly taut endless member entrained about the rotational members at incremental variations in rotational positions of the rotational members throughout at least a portion of a cycle of operation of the drive, and subtracting the minimum taut endless member length from the maximum taunt endless member length.

23. The method according to claim 16 further comprising the step of providing a slack reduction means in slack take-up relation to the drive.

24. The method according to claim 23 wherein the step of providing a slack reduction means comprises supporting displaceably a slack take-up manner in engagement with a run of the endless member.

25. The method according to claim 15 wherein the step of determining the operative surface shape of a pair of meshed noncircular gears comprises determining said shape for a pair of externally meshing gears, and the step of orienting comprises turning over one of said noncircular rotational members relative to its corresponding noncircular gear.

26. The method according to claim 15 wherein the step of determining the operative surface shape of a pair of meshed noncircular gears comprises determining said shape for a pair of internally meshing gears, the step of forming comprising providing one of the noncircular members with substantially the operative surface shape of an internal geared surface of the pair of gears and providing the other noncircular member with substantially the operative surface shape of an externally geared surface of the remaining gear of the gear pair.

27. The method according to claim 15 further comprising the steps of establishing the size of the rotational members by reducing the size thereof from the size of the noncircular gear measurements to decrease the inclination of the upper and lower runs of the endless member relative to a line between the axes of rotation of the rotational members.

28. The method according to claim 27 wherein the drive is a sprocket and chain drive and the step of reducing the size of the noncircular gear measurement includes arriving at a reduced size for each of the rotational members at which the sprocket pitch curve thereof equals an integral number of chain pitches.

29. A drive made by the method of any one of claims 15 through 24.

* * * * *